US009395437B2

(12) United States Patent
Ton et al.

(10) Patent No.: US 9,395,437 B2
(45) Date of Patent: Jul. 19, 2016

(54) MOVING MULTI-POLARIZATION MULTI-TRANSMITTER/RECEIVER GROUND PENETRATING RADAR SYSTEM AND SIGNAL PROCESSING FOR BURIED TARGET DETECTION

(71) Applicant: The United States of America, as represented by the Secretary of the Army, Fort Belvoir, VA (US)

(72) Inventors: Tuan T. Ton, Springfield, VA (US); David C. Wong, Clarksville, MD (US); Mehrdad Soumekh, Bethesda, MD (US)

(73) Assignee: THE UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 588 days.

(21) Appl. No.: 13/911,134

(22) Filed: Jun. 6, 2013

(65) Prior Publication Data

US 2016/0061948 A1 Mar. 3, 2016

(51) Int. Cl.
*G01S 13/88* (2006.01)
*G01S 13/02* (2006.01)
(Continued)

(52) U.S. Cl.
CPC .............. *G01S 13/885* (2013.01); *G01S 7/024* (2013.01); *G01S 7/4004* (2013.01); *G01S 13/0209* (2013.01); *G01S 13/86* (2013.01); *G01S 13/867* (2013.01); *G01S 13/89* (2013.01)

(58) Field of Classification Search
CPC ....................................................... G01S 13/885
USPC ............................................................. 342/22
See application file for complete search history.

(56) References Cited

U.S. PATENT DOCUMENTS 3,745,575 A 7/1973 Kikuchi
5,170,170 A 12/1992 Soumekh
(Continued)

FOREIGN PATENT DOCUMENTS

WO 02/086542 A2 10/2002

OTHER PUBLICATIONS

Tan-Huat Chio et al., "Large Wideband Dual-Polarized Array of Vivaldi Antennas with Radome", Asia Pacific Microwave Conference, vol. 1, Singapore, Institute of Electrical and Electronic Engineering, 92-95, 1999.*

(Continued)

*Primary Examiner* — Peter Bythrow
*Assistant Examiner* — Helena Seraydaryan
(74) *Attorney, Agent, or Firm* — Richard J. Kim

(57) ABSTRACT

A moving ground penetrating radar is comprised of multiple transmitters and receivers with multiple, e.g., Horizontal and Vertical, polarizations to detect buried targets with standoff capability. Novel signal and imaging techniques are used to form high quality radar imagery with low artifacts that are due to various sources of self-induced resonances, e.g., transmitter-receiver coupling, calibration errors, and motion errors in the multi transmitter/receiver channels of the radar system. The irradiated target area image is formed via exploiting both the spatial diversity of the physical multi-transmitter and multi-receiver array and synthetic aperture/array that is generated by the motion of the platform that carries the radar system. The images that are formed from the multiple polarizations are combined to remove surface targets/clutter and, thus, enhance signatures of buried targets.

7 Claims, 21 Drawing Sheets

(51) Int. Cl.
  *G01S 13/86* (2006.01)
  *G01S 7/02* (2006.01)
  *G01S 13/89* (2006.01)
  *G01S 7/40* (2006.01)

(56) References Cited

U.S. PATENT DOCUMENTS

| | | | |
|---|---|---|---|
| 6,204,797 | B1 | 3/2001 | Wicks et al. |
| 6,445,334 | B1 | 9/2002 | Bradley et al. |
| 6,522,285 | B2 | 2/2003 | Stolarczyk et al. |
| 7,190,302 | B2 | 3/2007 | Biggs |
| 7,528,762 | B2 | 5/2009 | Cerwin |
| 7,825,847 | B2 | 11/2010 | Fujimura |
| 7,885,429 | B2 | 2/2011 | Tu et al. |
| 7,893,862 | B2 | 2/2011 | Holly et al. |
| 7,920,088 | B2 | 4/2011 | Thompson et al. |
| 2003/0043067 | A1 | 3/2003 | Johansson et al. |
| 2009/0262011 | A1* | 10/2009 | Calderbank ........... G01S 13/284 342/188 |
| 2011/0199254 | A1* | 8/2011 | Bishop ................... G01S 13/89 342/179 |
| 2014/0218225 | A1* | 8/2014 | Simicevic ................ H01Q 9/28 342/22 |

OTHER PUBLICATIONS

M. Soumekh, "Signal Subspace Fusion of Uncalibrated Sensors with Application in SAR and Diagnostic Medicine", IEEE Transactions on Image Processing, vol. 8, No. 1, Jan. 1999.*
M. Soumekh, "Moving Target Detection and Imaging Using an X Band Along-Track Monopulse SAR", IEEE Transactions on Aerospace and Electronic Systems vol. 38, No. 1 Jan. 2002.*
Vikram R. Anreddy, "Indoor MIMO Channels with Polarization Diversity: Measurements and Performance Analysis", School of Electrical and Computer Engineering, Georgia Institute of Technology, May 2006.*
S. Vitebskiy, L. Carin, M. Ressler, and F. Le, "Ultra-Wideband Short-Pulse Ground Penetrating Radar: Simulation and Measurement," IEEE Trans. Geosciences and Remote Sensing, vol. 35, No. 3, May 1997, pp. 762-772.
L. Nguyen, K. Kappra, D. Wong, M. Ressler, and J. Sichina, "Mine Detection Performance in Different Soil Conditions Using Data from an Ultra-Wideband Wide-Area Surveillance Radar." Proceedings of SPIE, Detection and Remediation Technologies for Mines and Mine-like Targets IV, pp. 930-941. Aug. 1999.
K. Shlager, G. Smith, and J. Maloney, "TEM Horn Antenna for Pulse Radiation: an Improved Design." Micro. Opt. Tech Letters 1996, 12(2), 86-90.
T.H. Chao, and D. Schaubert, "Large Wideband Dual-Polarized Array of Vivaldi Antennas with Radome." Asia Pacific Microwave Conference, vol. 1, Singapore, Institute of Electrical and Electronic Engineering, 92-95, 1999.
M. Soumekh, Synthetic Aperture Radar Signal Processing, Wiley, New York, 1999, pp. 34-39, 212-215, 574-578, 553-555.
M. Soumekh, "SAR-ECCM using phase-perturbed LFM chirp signals and DRFM repeat jammer penalization," IEEE Transactions on Aerospace and Electronic Systems, vol. 42, No. 1, pp. 191-205, Jan. 2006.
Tuan Ton, David Wong, and Mehrdad Soumekh, "ALARIC Forward-Looking Ground Penetrating Radar System with Standoff Capability," IEEE International Conference on Wireless Information Technology and Systems (ICWITS), pp. 1-4, 2010.
M. Soumekh, "Signal Subspace Fusion of Uncalibrated Sensors with Application in SAR and Diagnostic Medicine," IEEE Transactions on Image Processing, vol. 8, No. 1, pp. 127-137, Jan. 1999.
K. Ranney and M. Soumekh, "Hyperspectral anomaly detection within the signal subspace," IEEE Geoscience and Remote Sensing Letters, vol. 3, No. 3, pp. 312-316, Jul. 2006.
K. Ranney and M. Soumekh, "Signal subspace change detection in averaged multilook SAR imagery," IEEE Transactions on Geoscience and Remote Sensing, vol. 44, No. 1, pp. 201-213, Jan. 2006.
L. Nguyen, M. Ressler, D. Wong, M. Soumekh, "Enhancement of backprojection SAR imagery using digital spotlighting preprocessing," Proceedings of IEEE Radar Conference, pp. 53-58, 2004.
U. Majumder, M. Soumekh, M. Minardi, and J. Kirk, "Spatially-varying calibration of along-track monopulse synthetic aperture radar imagery for ground moving target indication and tracking," IEEE International Radar Conference, pp. 452-457, 2010.

* cited by examiner

MOVING MULTI-POLARIZATION MULTI-TRANSMITTER/RECEIVER GROUND PENETRATING RADAR SYSTEM AND SIGNAL PROCESSING FOR BURIED TARGET DETECTION

GOVERNMENT INTEREST

The invention described herein may be manufactured, used, sold, imported, and/or licensed by or for the Government of the United States of America.

FIELD OF THE INVENTION

This invention relates in general to ground penetrating radar systems, and more particularly, to multi-polarization and multi-transmitter/receiver ground penetrating radar systems.

BACKGROUND OF THE INVENTION

Buried threats have proven to be extremely dangerous on the battlefield. The current preferred method for detecting these buried targets is to use downward-looking ground penetration radar. In general, these radar systems perform adequately when the antenna apparatus is placed close to the ground surface and directly above the target. However, the major drawback of these systems is that they lack standoff capability.

More recently, new emphasis has been placed on a GPR system that exhibits standoff capability. Another key element in defining the utility of these systems is their ability to detect buried targets in the ground. While short range penetration of road dust and other media is typically not a problem for most radar systems, it is known that high frequency radio waves (at or above S-band) do not penetrate ground very well.

Meanwhile, lower frequencies have been shown to penetrate ground and other media much more effectively, and have been documented in the past. (See, e.g., S. Vitebskiy, L. Carin, M. Ressler, and F. Le, "Ultra-Wideband Short-Pulse Ground Penetrating Radar: Simulation and Measurement," IEEE Trans. Geosciences and Remote Sensing, Vol. 35, No. 3, May 1997, pp. 762-772; and L. Nguyen, K. Kappra, D. Wong, M. Ressler, and J. Sichina, "Mine Detection Performance in Different Soil Conditions Using Data from an Ultra-Wideband Wide-Area Surveillance Radar." Proceedings of SPIE, Detection and Remediation Technologies for Mines and Minelike Targets IV, pp. 930-941. August 1999.) Such a system, coupled with the ability to interrogate an area from long distance will provide new capability on the battlefield in the future.

SUMMARY OF THE INVENTION

The present invention presents novel hardware design and associated signal processing and imaging algorithms for standoff detection of buried targets using a Ground Penetrating Radar (GPR) system that is comprised of spatially-diverse multiple transmitters and receivers with multiple polarizations on a moving platform. Specifically, an exemplary moving Ground Penetrating Radar (GPR) is comprised of multiple transmitters and receivers with multiple (Horizontal and Vertical) polarizations to detect buried targets with standoff capability. Novel signal and imaging techniques are used to form high quality radar imagery with low artifacts that are due to various sources of self-induced resonances (e.g., transmitter-receiver coupling), calibration errors, and motion errors in the multi transmitter/receiver channels of the radar system. The irradiated target area image is formed via exploiting both the spatial diversity of the physical multi-transmitter and multi-receiver array and synthetic aperture/array that is generated by the motion of the platform that carries the radar system. The images that are formed from the multiple polarizations are combined to remove surface targets/clutter and, thus, enhance signatures of buried targets. The GPR system is also capable of simultaneous transmission of diverse and uncorrelated waveforms (pulses) at different (Horizontal and Vertical) polarizations. A digital signal processing (matched-filtering) module is used to separate the echoed signals of the two polarized transmissions.

In the past decade, the multi-Transmitter/Receiver (array-based) GPR systems have primarily used their physical arrays (aperture) as well as their radar bandwidth for imaging (resolution); the conventional backprojection or time domain correlation imaging has been used for this purpose. Those multi-Transmitter/Receiver (array-based) GPR systems rarely tried to exploit imaging information that is created by the motion of the platform. The ground-based multi-Transmitter/Receiver (array-based) GPR community has referred to this as multi-look imaging though in the radar community this is better known as Synthetic Aperture Radar (SAR) imaging that has become an effective tool for airborne Intelligence, Surveillance and Reconnaissance (ISR) applications.

The failure of the multi-Transmitter/Receiver (array-based) GPR community to exploit synthetic aperture information might have been due to utilization of inaccurate platform motion information. The Army Look-ahead Radar Impulse Countermine (ALARIC) system is equipped with an accurate GPS system. As a result, we are capable of processing both physical and synthetic aperture imaging even when the platform moves along a nonlinear path with variations in its heading.

Moreover, we have shown that the combination of a single transmitter and a single receiver and synthetic aperture processing yields a "fair" image of the scene, though there are layer-over effects, i.e., there is no sense of left or right side of the scene. Coherent addition (combination) of all the Transmitter/Receiver images is a conventional approach for forming the image of the interrogated scene that results in separating the left and right sides of the scene, though the primary imaging (resolution) information comes from the synthetic aperture data. (The physical array practically performs digital beamforming for this purpose).

This coherent processing is ideal for simulated error-free data. However, realistic multi-Transmitter/Receiver (array-based) GPR data contain various errors even after calibration; these results in undesirable side lobes, aliasing ghosts, etc. The US Army, Night Vision and Electronic Sensors Directorate (NVESD) has developed a nonlinear processing of the Transmitter/Receiver images, which exploits a measure of similarity among them, to adaptively suppress some of the above-mentioned artifacts. This algorithm is referred to as Adaptive Multi-Transmitter/Receiver Imaging (AMTRI).

The present invention also exploits properties of electromagnetic (radar) waves polarization to detect buried structures. It is known that horizontally-polarized radar waves cannot penetrate from air to soil and vice versa. Meanwhile, the vertically-polarized radar waves exhibits some penetration at the boundary of air and soil. The invention utilizes multiple polarization radar data (that is, VV, VH, HV and HH) that are acquired at spatially-diversified transmitters and receivers, some of which are horizontally-polarized, and the others are vertically-polarized, to suppress surface targets and enhance the signature of buried structures. We construct an adaptive difference of horizontally-polarized and vertically-polarized images to suppress the signature of the surface clutter, while enhancing the signatures of buried targets.

This approach could also utilize simultaneous transmission of diverse and uncorrelated waveforms at different polarizations (that is, horizontal and vertical) at all platform position, and a digital signal processing module to separate the echoed signals of the two polarized transmissions. As a result, the GPR system yields a database that has a sampling rate in the synthetic aperture domain that is twice the aperture sampling rate of a system that alternates transmissions between the two polarizations (that is, horizontally/vertically transmissions have to occur at every other platform positions). A database with a higher sampling rate is less susceptible to Doppler frequency aliasing.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

A specific reference is made to a grace period inventor disclosure at a government symposium as follows: Tuan Ton, David Wong, and Mehrdad Soumekh, "Adaptive Multi-Transceiver Imaging for Forward-Looking Ground Penetrating Radar," 58th Annual Meeting of the Military Sensing Symposia (MSS) Tri Service Radar Symposium. Ton et al. does not name additional authors other than the named co-inventors of the subject patent application. The Ton et al. presentation in Volume 1 of MSS-TSRS-12-033, 2012 is not available to the public.

1. ALARIC Multi-Transmitter/Receiver (Array-Based) GPR: A moving multi-polarization multi-transmitter/receiver Forward Looking Ground Penetrating Radar (FLGPR) system is discussed, e.g., for standoff detection of buried targets within an irradiated scene.

Figure 1A:
FIG. 1a shows a perspective view of an exemplary vehicle-mounted ALARIC multi-Transmitter/Receiver (array-based) GPR system.
Figure 1B:
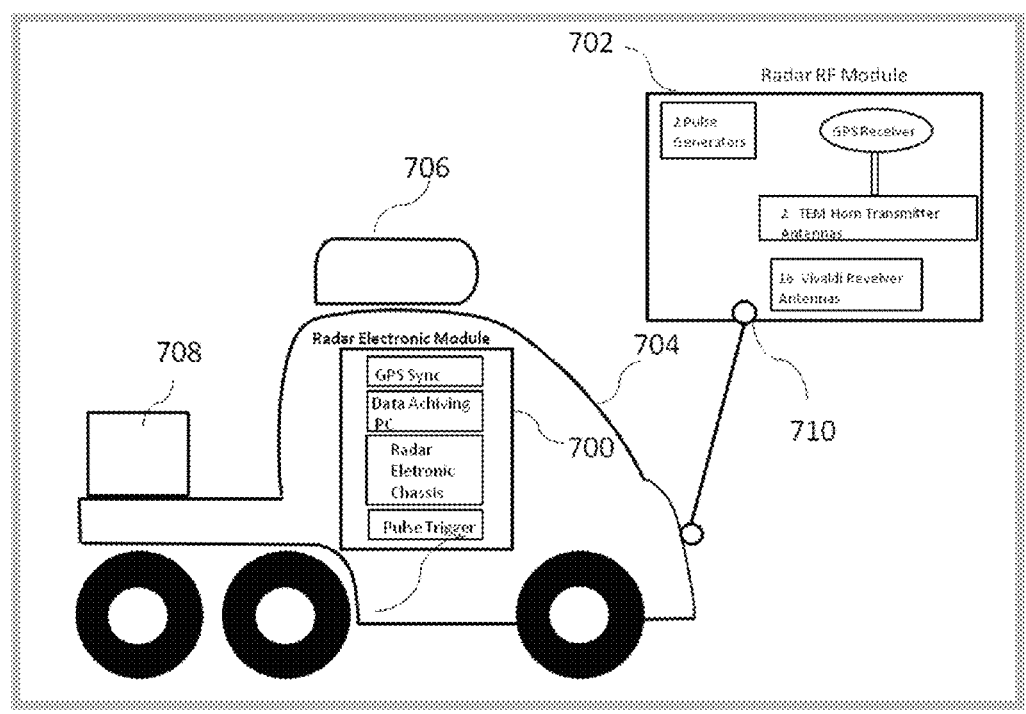
FIG. 1b shows an exemplary ALARIC multi-Transmitter/Receiver (array-based) GPR System Block Diagram.

ALARIC is a prototype radar system (FIG. 1a) designed and constructed by the U.S. Army Night Vision and Electronic Sensors Directorate (NVESD). Shown in FIG. 1a is an exemplary profile view of vehicle-mounted ALARIC multi-transmitter/receiver array based ground penetrating radar. The goal of this prototype is to use radar technology for ground vehicle application to detect buried targets from a safe distance. The radar is an ultra-wideband, impulse based system that has a maximum standoff capability of about 25 meters in range. The system can collect data while moving forward at a nominal speed up to about 5 Km/h. FIG. 1b shows an exemplary block diagram for such an ALARIC multi-transmitter/receiver (array-based) GPR system. FIG. 1b illustrates, e.g., the vehicle-configured radar hardware, including two main modules; the Radar Electronic Module 700 and the Radar Radio Frequency Module 702.

Figure 1C:
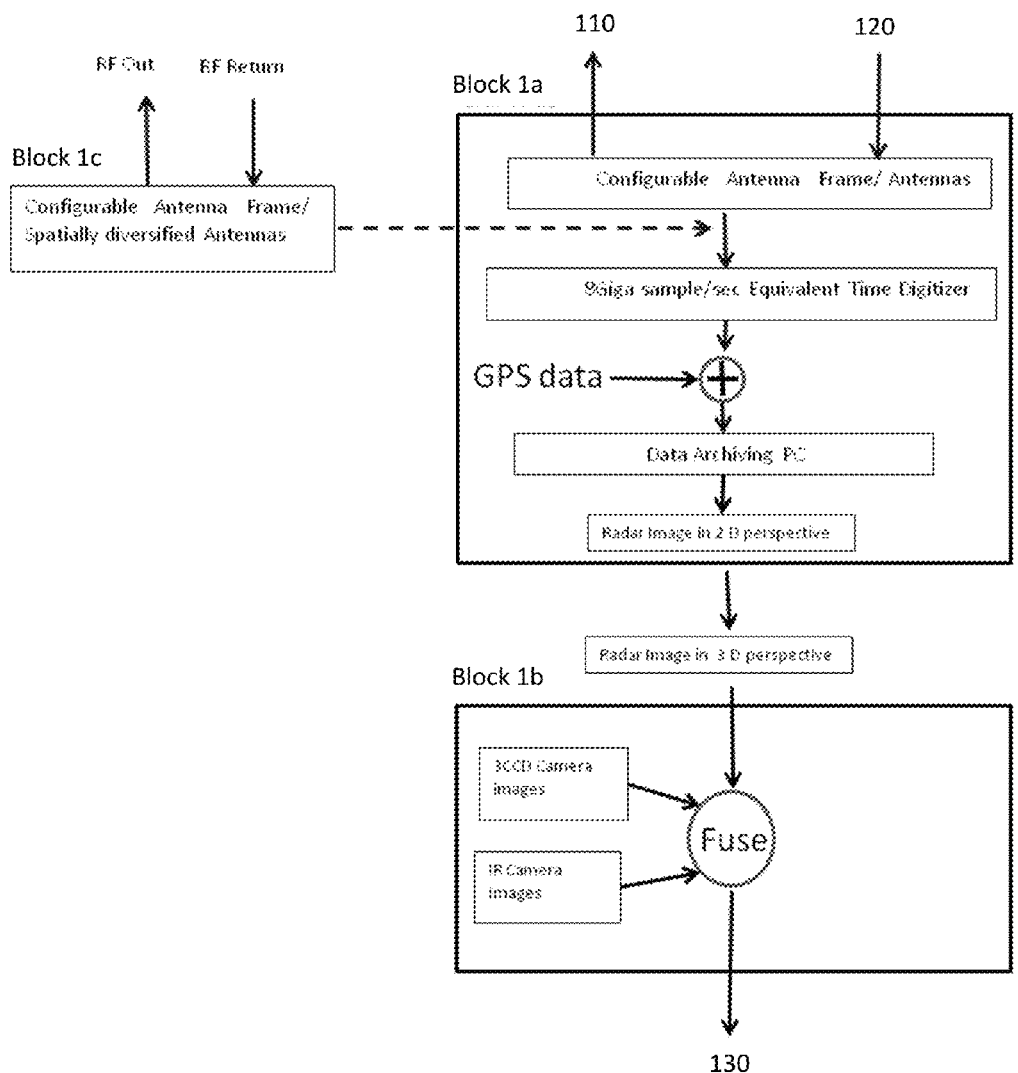
FIG. 1c shows an exemplary method of multi-polarization multi-transmitter/receiver ground penetrating radar standoff detection.

Standoff detection is described for surface and buried targets in or on the road side for ground vehicle using RF impulse signal. FIG. 1c shows an exemplary method of multi-polarization multi-transmitter/receiver ground penetrating radar standoff detection. Referring to Block 1a, a sequence of 1 ns wide, 50 volt peak-to-peak RF impulse signals 110 are transmitted by using either one or a number of impulse generators paired with transmit antennas, while the vehicle moves forward on the road. The transmit antenna is placed at the center of the antenna frame in either horizontal or vertical polarization. The antenna frame is mounted on an articulable telescope boom, which enables the radar to be configured for different scanning modes. The forward-looking mode is optimized for in-road targets detection, the side-looking mode is optimized for off-road targets, and squint-looking mode is used both types of targets; the returned impulse RF signals 120 are captured by an array of sixteen identical Vivaldi notch antennas placed in either the horizontal or the vertical polarization inside the antenna frame; the impulse signals come out of Vivaldi notch antennas are in analog format and then converted to digital format by a digitizer which uses Equivalent Time Sampling technique to digitize the analog signals at a equivalent rate of 8 G samples/second; the digitized signals coming out of the digitizer are then interleaved with header and trailer, which contain geo-locations, and time information from the GPS Resync Module; and the radar data stream along with the GPS information are archived to hard drive in a Data Archiving PC. The Archived Radar data are processed to produce Radar Images and stored in computer memory.

Specifically, referring back to FIG. 1b, both the Radar Electronic Module 700 and the Radar Radio Frequency Module 702 are mounted on a John Deere M-Gator surrogated vehicle 704. The radar electronic module is designed with PECL logic families that are very fast but generate a large amount of heat, which a roof top mounted Air Conditioner unit 706 is used to provide cooling for the electronics equipment. The radio frequency module contains transmit and receive antennas of the radar system. A pair of pulse generators, which is controlled by the radar electronic module, completes the RF module. While the gator testbed is diesel powered, the entire radar system is powered by a portable gasoline generator 708 mounted at the back of the vehicle.

Figure 2:
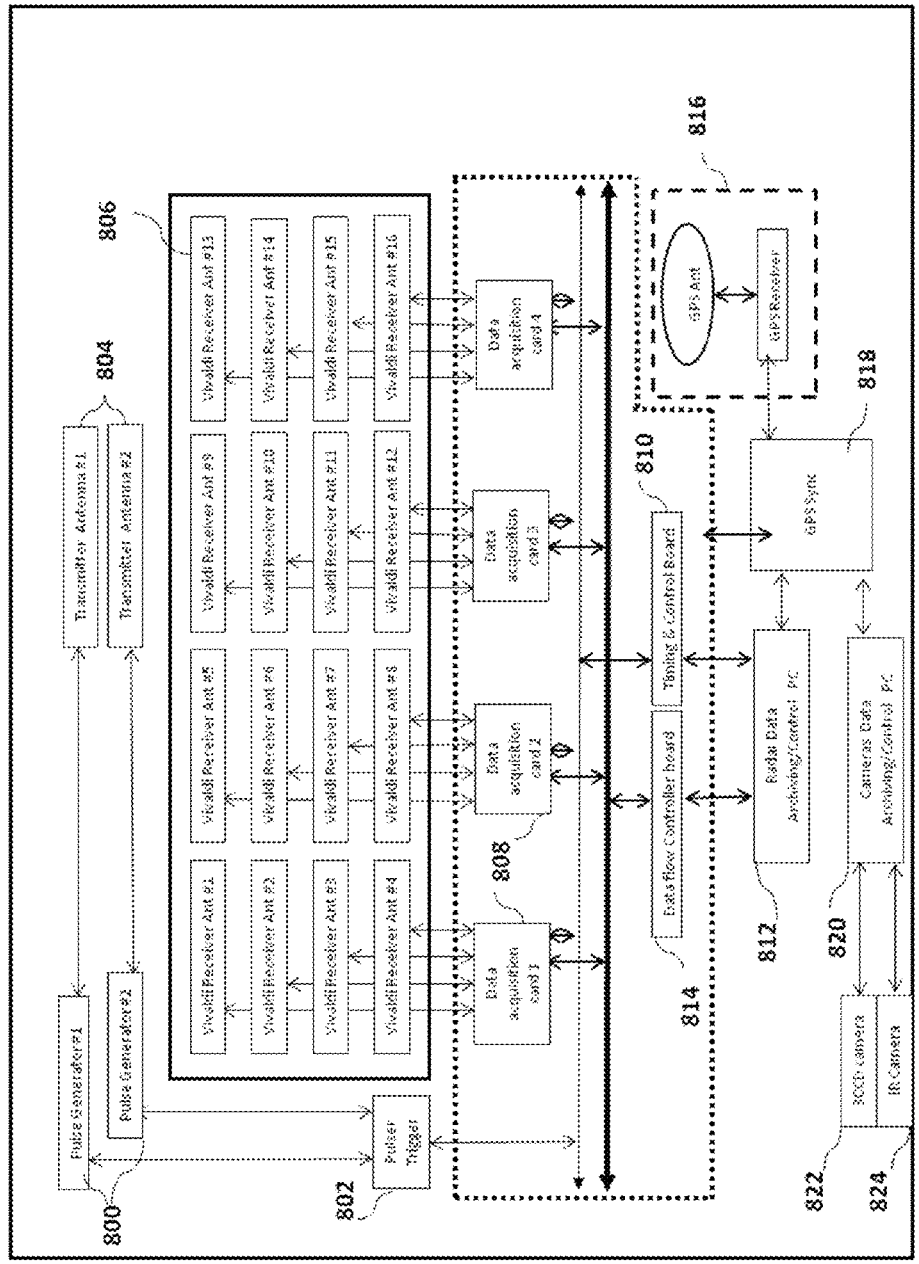
FIG. 2 shows an exemplary ALARIC multi-Transmitter/Receiver (array-based) GPR detailed system block diagram.

A detailed radar system block diagram for such an exemplary ALARIC multi-transmitter/receiver (array-based) GPR system is shown in FIG. 2. Some notable highlights of the radar system are included in the following section. In the figure, the Impulse Generator Triggering units Module 802 will activate the two Impulse Generators Module 800, which generate a 50 Vpp impulse that has a center frequency at around 950 MHz, and occupies a bandwidth that spans between 300-3000 MHz. The down range resolution is derived from this bandwidth and is about 5 cm. The impulse signals are then fed to a pair of TEM horn transmit antennas 804, placed at either the two ends or the center of the Antenna Frame, to provide good pulse fidelity while minimizing the reflected power of the transmitter. (See, e.g., K. Shlager, G. Smith, and J. Maloney, "TEM Horn Antenna for Pulse Radiation: an Improved Design." Micro. Opt. Tech Letters 1996, 12(2), 86-90, incorporated herein by reference.) The returned RF signals are captured by an array of sixteen identical Vivaldi notch antennas 806.

These receive antennas are selected because of their size and low cross coupling between antennas in the array. (See, e.g., T. H. Chao, and D. Schaubert, "Large Wideband Dual-Polarized Array of Vivaldi Antennas with Radome." Asia Pacific Microwave Conference, Vol. 1, Singapore, Institute of Electrical and Electronic Engineering, 92-95, 1999, incorporated herein by reference.) After the signals are captured by the receive antennas, the data are digitized and passed to the four Data Acquisition cards Module 808. Each card can receive four analog input signals from four receiver antennas Module 806. A Timing and Control board Module 810 provides the clock references and controls the overall operation of the radar system. Furthermore, the timing and control board also serves as a microcontroller interface that includes triggering the pulse generator at 1 MHz PRF and providing a stable clock for sampling the return signal at an effective 8 GHz sampling rate. The core of the circuit is a Field Programmable Gate Array (FPGA) chip that provides state machine logic and ultra-precise timing for the radar.

As the radar moves along the test lane, data is continuously collected so that a two dimensional synthetic aperture image is formed. The data from the four acquisition cards are passed to a Radar Data Archiving/Control PC Module 812 which acts as the operator control, status display, and data archiving via the data flow controller card Module 814. To acquire the exact location of the radar during data collection, a high precision GPS system Module 816 is used to determine the location by timing the satellite signals transmitted to the GPS receiver. At the midpoint of each radar frame during data collection, the timing and control electronic module triggers the GPS Sync Unit Module 818, which activates the hardware element to extract the location and time information from the GPS data stream. The result is buffered along with the radar data and feed to the Data Archiving computer for data storage.

A method is described to fuse the radar data with photos of a 3-CCD-camera, and an IR camera to improves the overall detection performance of the system. FIG. 1c shows an exemplary method of multi-polarization multi-transmitter/receiver ground penetrating radar standoff detection. Referring specifically to Block 1b, such a method is comprised of the following steps: Using computers to continuously trigger the cameras, transferring captured images to computers, and assigning a frame number to each of the captured images; using a GPS Resync Module to store into the computer the GPS times, locations, and the frame numbers of the photo images whenever the cameras are triggered; after radar images are formed, if suspicious threat are detected in the radar image, then convert radar images from a 2-dimensional into a 3-dimensional perspective as in the camera photo images; using the GPS data as index to retrieve the corresponding photo images of 3-CCD camera and IR cameras from computer memory; and fusing camera photo images with radar images 130 to help determine whether a detected threat is sufficiently real.

Specifically, to improve the overall detection performance while reducing the false alarm rate of the radar, the system employs a 3-CCD-camera Modules 822 and an IR camera Module 824 as shown in FIG. 2. The goal is to collect still photo images of the scene in front of radar as it moves along the road. The camera systems provide visual information in the optical domain while the radar interrogates the same scene in the RF domain.

The synchronization process among the sensors is described in the following paragraph. During data collection, both cameras take pictures independently and at different rates. To geo-reference the locations where the images are taken, the GPS Sync Module 818 detects when each of the 2 cameras or the Radar is triggered, and then immediately parses the GPS data stream to include a timestamp, photo number, and GPS location for each photo image to radar Data. The results are passed to the Camera Data Archiving and Control PC Module 820 for storage. When targets are detected in the radar image, the computer will convert the radar images from 2-dimensional perspective to 3-dimensional perspective as in the camera photos. The GPS data are then used to index and retrieve the correspondent cameras photos. These color and IR camera images can be fused together with the radar image to create a 3-dimensional rendering of the landscape such as in augmented reality. The purpose is to ascertain additional sensory information in different domains to determine whether a detected threat is sufficiently real. By combining the information from multiple sensors, the false alarm rate may be reduced while improving the overall detection performance of the system.

An exemplary arrangement used to collect data for image processing is described. FIG. 1c shows an exemplary method of multi-polarization multi-transmitter/receiver ground penetrating radar standoff detection. Referring specifically to Block 1c, the transmit and two types of receive antennas are spatially-diversified, some of which have H polarization and others with V polarization, to achieve optimum signal returns for surface and buried targets. The method comprised of the following steps: Placing the transmit antennas in either horizontal or vertical polarization for transmitting impulse RF signal. Use two different sets of Vivaldi antennas for receiving the returned impulse RF signals. The first set of Vivaldi antennas, which has the frequency range from 200 MHz to 3000 MHz, is oriented in the vertical polarization. The second set of Vivaldi antennas, which has frequency range from 500

MHz to 3000 MHz, is oriented in the horizontal polarization. Interleave the location of the receive Vivaldi antennas. The first antenna in the array is from the first set, and the second antenna is from the second set. Repeat the configuration for the rest of the receiving antennas in the antenna array. These unique arrangements are used to collect data to be used for the Image Processing Algorithm described later.

Such an exemplary arrangement is based on a signal processing module to fuse coherent complex four images that are formed from the four polarizations, that is, VV, VH, HV and HH, via an adaptive filtering method to suppress the surface targets/clutter while enhancing the signatures of buried targets that comprises of:

a. A continuous-domain multidimensional signal model and its discrete version to relate multi-polarization via a two-dimensional linear spatially-varying as shown below for, e.g., VV and VH images (see Section 6), $$f_{VH}(x,y) = \int\int f_{VV}(x-u, y-v) h_{xy}(u,v) du dv;$$

b. A localized adaptive filtering method, called Local Signal Subspace Processing (LSSP), to calibrate two images at different polarizations;

c. A forward and backward LSSP approach to create a difference image, called a Subspace Difference (SSD) image, that represents changes and, thus, buried targets in the two images at different polarizations; and d. A spatially-varying version of LSSP, called Global Signal Subspace Processing (GSSP), to calibrate two images at different polarizations using a 2D spatially-varying filter that produces an SSD image that does contain boundary artifacts between the subpatches that are used in LSSP.

Figure 3A:
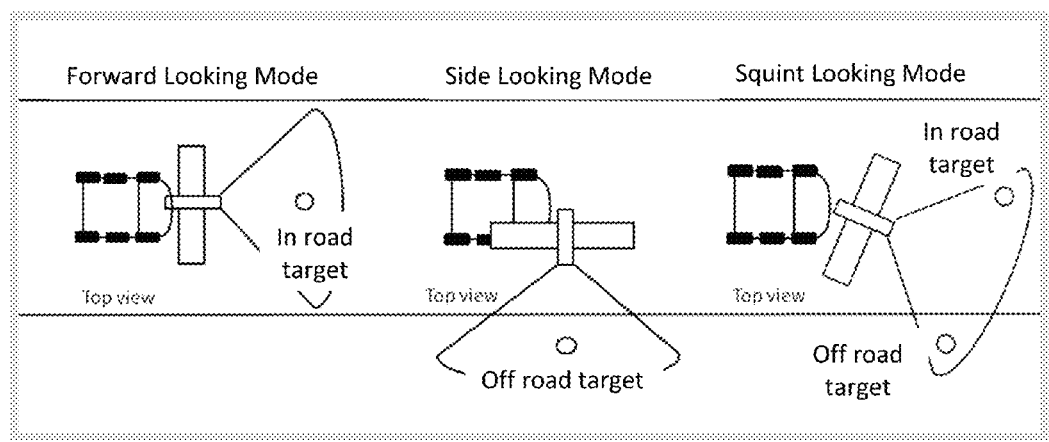
FIG. 3a shows an exemplary ALARIC Radar in different configuration to detect different type of targets, e.g., forward looking mode, side-looking mode and squint looking mode.

Specifically, during data collection, the antenna frame of the RF module can swivel at the mechanical pivot joints (FIG. 1b, module 710) to operate the radar at different scanning modes as illustrated in FIG. 3a. Specifically, FIG. 3a shows an ALARIC radar in various exemplary configurations to detect various targets. The forward-looking mode is mainly for in-road targets detection, the side-looking mode is for off-road targets, and squint-looking mode for both types of targets. Furthermore, the transmit and receive antennas can be oriented either vertically or horizontally. In general, the vertical polarization is often used for penetrating the ground while the horizontal polarization is typically more suited for surface and road side targets.

Figure 3B:
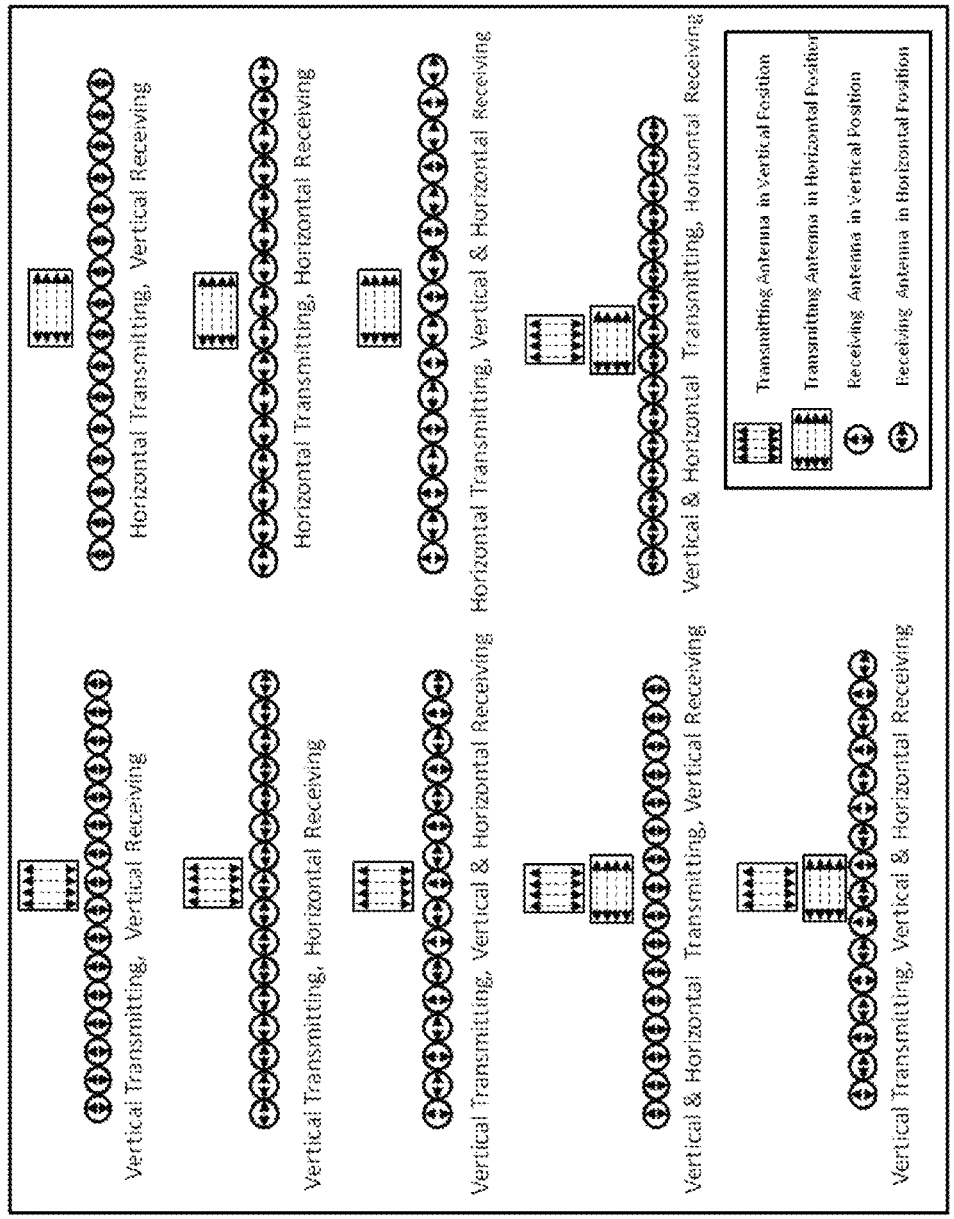
FIG. 3b shows exemplary radar configurations with different Antennas Polarizations.
Figure 3C:
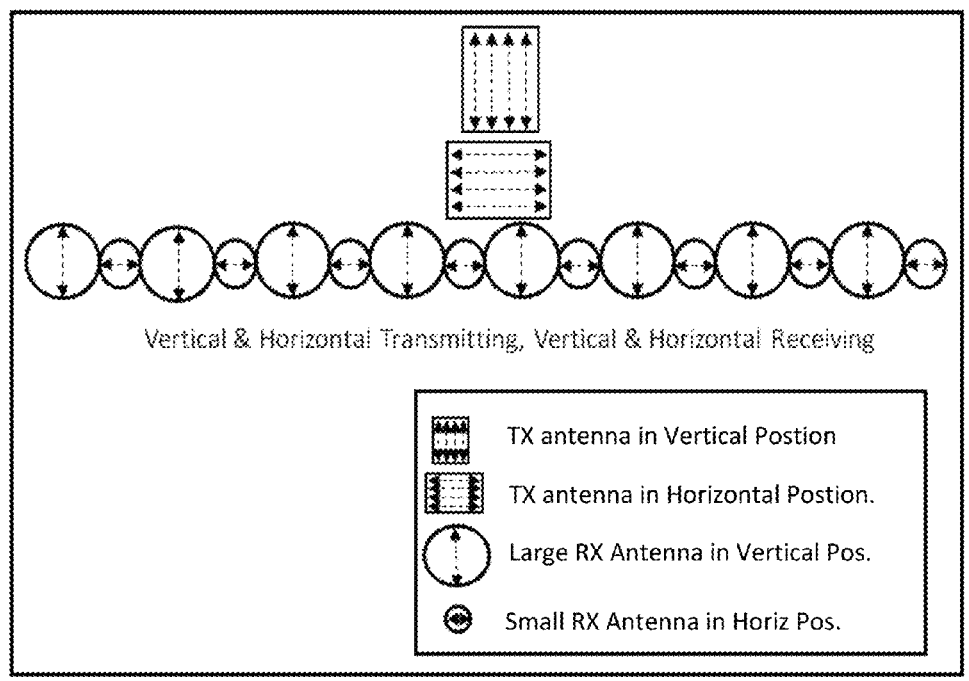
FIG. 3c shows exemplary radar configurations with different receiving Antennas types and Polarizations.

FIG. 3b shows several different configurations of antenna polarizations that the radar antenna frame can be configured. FIG. 3c shows the configuration in which 3 different set of antennas are used for data collection; the TEM horn antenna for transmitting, and 2 types of Vivaldi antennas for receiving. The larger Vivaldi antennas, with frequency range from 200 MHz to 3000 MHz, is oriented vertically for the detection of buried target while the smaller Vivaldi antenna, with frequency range from 500 MHz to 3000 MHz, is oriented horizontally, which is suited for surface targets. These unique arrangements are used to collect data for algorithm processing. For example, a signal processing module can be used for calibration of multi-transmitter/receiver channel images, comprising a system model for uncalibrated reconstructed images in a multi-transmitter and multi-receiver radar on a moving platform based on $$f_{Im}(x_m, y_n) = f_I(x_m - x_{Is}, y_n - y_{Is}) \exp(j\phi_I); \text{ and}$$

an iterative correlation-based phase and time-delay estimation algorithm to calibrate multi-transmitter/receiver images using a reference image that is generated from the mean value of the multi-transmitter/receiver images in each iteration. The combination of articulable antenna frame, multi-polarization transmit and receive antennas coupled with novel signal processing algorithm has enabled the radar system to detect many difficult targets during demonstration.

Next, we describe the AMTRI algorithm. The approach is based on a series of adaptive calibration and processing of the measured data and formed backprojection imagery for each transmitter/receiver pair of the radar system.

2. Self-Adaptive Calibration of Measured Data Using SIR Signal. A signal processing system for self-adaptive calibration of measured echoed data using Self-Induced Resonance (SIR) signals is disclosed. Such a self-adaptive calibration system comprises:

a. A system model for uncalibrated measured data of a single transmitting radar and a single receiving radar on a moving platform that are contaminated with self-induced resonance (SIR) signals:

$$s_{IM}(t, u_j) = [s_I(t, u_j) + s_{ISIR}(t)] * h_I(t, u_j); \text{ and}$$

b. A correlation-based time-delay and transfer function estimation algorithm to calibrate the measured radar data using a reference SIR signal that is generated via averaging the measured data in the aperture domain.

Specifically, ALARIC transmitters and receivers are installed on a rack on top of a lift that is connected to the Gator; the Transmitter/Receiver system is operated while the entire lift is driven forward. Proximity of imaging scene (near range) causes contamination of SAR data with reflection and resonances of the radar signal with the lift as well as transmitter to receiver leakage that are also known as Self-Induced Resonance (SIR) signal errors. In this section, we provide a system model for the SIR signal and a method to suppress its signature in the measured data. The SIR suppression method is based on a linear signal subspace processing (SSP) of the SIR signal; the mathematical foundation of this approach is the same as an adaptive filtering algorithm that we have developed for coherent change detection and moving target detection in SAR systems. (See, e.g., chapter 8 of M. Soumekh, Synthetic Aperture Radar Signal Processing, Wiley, New York, 1999; M. Soumekh, "Signal Subspace Fusion of Uncalibrated Sensors with Application in SAR and Diagnostic Medicine," IEEE Transactions on Image Processing, vol. 8, no. 1, pp. 127-137, January 1999; K. Ranney and M. Soumekh, "Hyperspectral anomaly detection within the signal subspace," IEEE Geoscience and Remote Sensing Letters, vol. 3, no. 3, pp. 312-316, July 2006; K. Ranney and M. Soumekh, "Signal subspace change detection in averaged multilook SAR imagery," IEEE Transactions on Geoscience and Remote Sensing, vol. 44, no. 1, pp. 201-213, January 2006; L. Nguyen, M. Ressler, D. Wong, M. Soumekh, "Enhancement of backprojection SAR imagery using digital spotlighting preprocessing," Proceedings of IEEE Radar Conference, pp. 53-58, 2004; and U. Majumder, M. Soumekh, M. Minardi, and J. Kirk, "Spatially-varying calibration of along-track monopulse synthetic aperture radar imagery for ground moving target indication and tracking," IEEE International Radar Conference, pp. 452-457, 2010, all of which are incorporated herein by reference.

Before delving into the issue of SIR suppression, we first outline a procedure to exploit SIR signal to calibrate the multi-Transmitter/Receiver channels of ALARIC; in fact, SIR suppression is also achieved in the process of calibrating the Transmitter/Receiver channels. We denote the number of the Transmitter/Receiver combinations for the radar system at a given polarization (that is, VV, VH, HV or HH) by L. We use the index l=1, 2, . . . L to identify each Transmitter/Receiver pair. We denote the synthetic aperture position by the variable u. We identify the discrete points on the synthetic aperture where the radar measurements are made by $u_j$, $j=1, 2, \ldots, J$ where J is the number of radar positions. We denote the fast-time domain by the variable t. We also make discrete measurements of the radar data in the fast-time t domain. However, for notational simplicity, we do not identify the discrete fast-time samples, and treat the fast-time as a continuous variable except when we discuss the Least Mean-Squared (LMS) error equation later.

We denote the measured radar bistatic signal for each Transmitter/Receiver combination and each radar position via the following:

$$s_l(t,u_j); \text{ for } j=1,2,\ldots,J, \text{ and } l=1,2,\ldots L.$$

At a given aperture position $u_j$, the interaction of the transmitted impulse radar with the receivers, platform, etc. (and the radar-carrying gator, etc.) results in a fast-time t varying SIR signature that is, in theory, invariant in the aperture position $u_j$. We denote this signal via $s_{l,SIR}(t)$. Thus, in theory, the measured SAR signal can be modeled via $$s_{lM}(t,u_j)=s_l(t,u_j)+s_{lSIR}(t). \quad (1)$$

Thus, provided that we have a priori knowledge of the SIR signal, the SAR signal can be recovered from the measured data via a simple subtraction.

In practice, however, there exists an issue that complicates matters. Subtle position variations of the lift, truck, etc. could result in small perturbations and delays in the SAR and SIR signal; these variations do vary with the aperture position $u_j$. To identify these variations in the acquired data, we use the following linear model:

$$s_{lM}(t,u_j)=[s_l(t,u_j)+s_{lSIR}(t)]*h_l(t,u_j); \quad (2)$$

in the above model, * denotes convolution in the fast-time domain. The signal $h_l(t,u_j)$ is an unknown impulse response; this signal is used to model the aperture-dependent subtle variations in the measured data.

Figure 4:
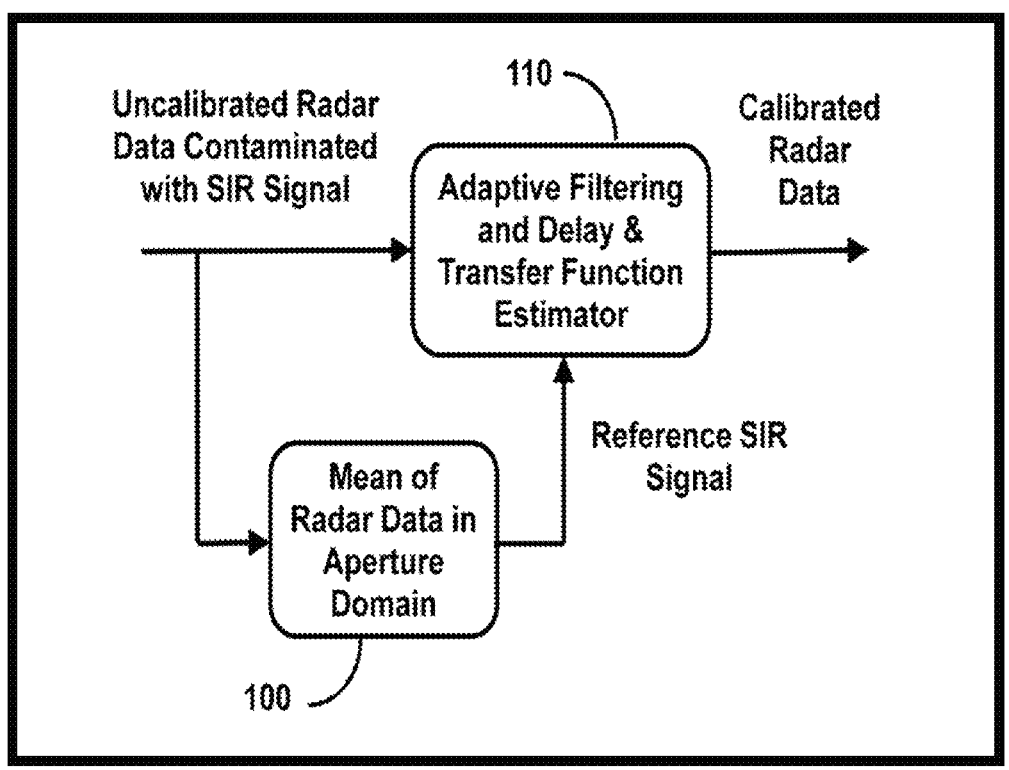
FIG. 4 shows an exemplary self-adaptive calibration of measured data using SIR signal and suppression of SIR signal.

We use a Least Mean-Squared (LMS) error method using the measured signal $s_{lM}(t,u_j)$ and a reference SIR signal to estimate the unknown impulse response, that is, $h_l(t,u_j)$. (See, e.g., chapter 8 of M. Soumekh, Synthetic Aperture Radar Signal Processing, Wiley, New York, 1999, incorporated herein by reference.) The algorithm flowchart is shown in FIG. 4. Specifically, FIG. 4 shows an exemplary self-adaptive calibration of measured data using SIR signal and suppression of SIR signal. Module 100 in this figure yields a estimated reference of the SIR signal by constructing the mean (average) of each single transmitter/receiver pair (bistatic) data in the synthetic aperture domain. Module 110 in FIG. 4 is a 2D adaptive filter that estimates the calibration errors (that is, the unknown impulse response or transfer function and the system delay) in the measured radar data using the estimated reference SIR signal.

3. Self-Adaptive Suppression of SIR Signal

Figure 5A:
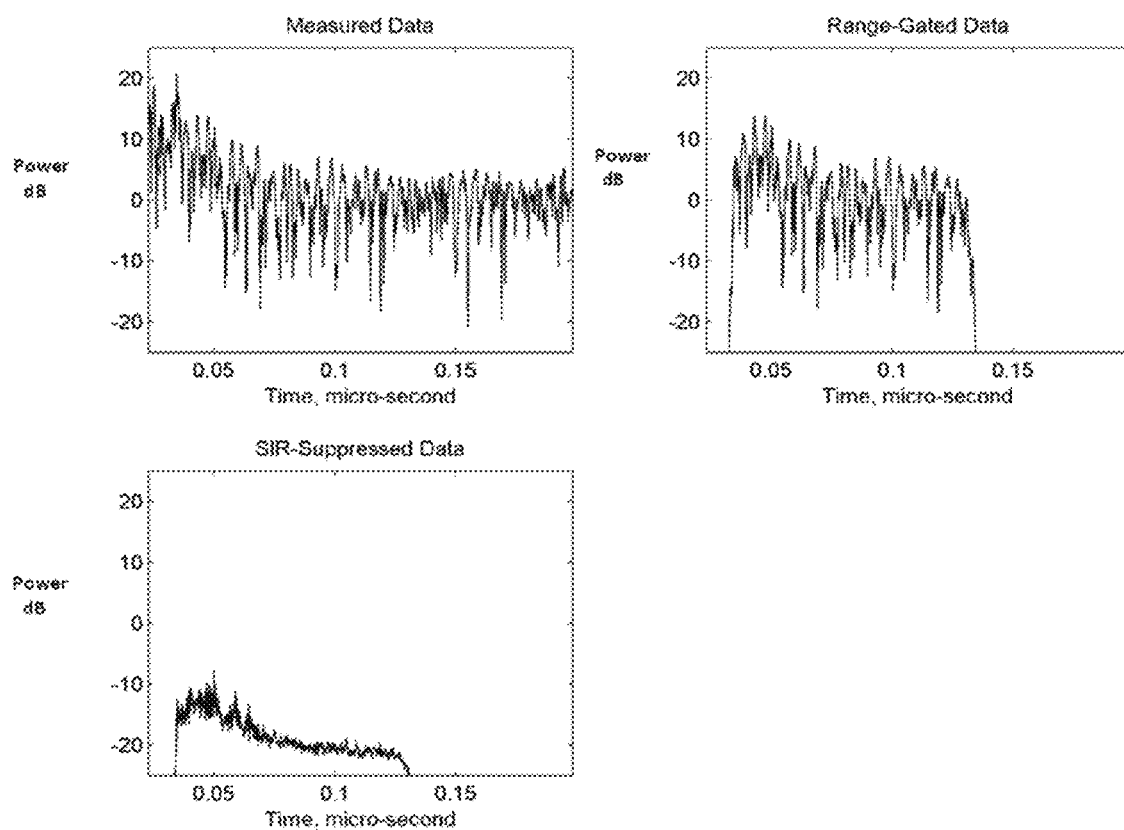
FIG. 5a shows exemplary measured, range-gated, and SIR-suppressed data.
Figure 5B:
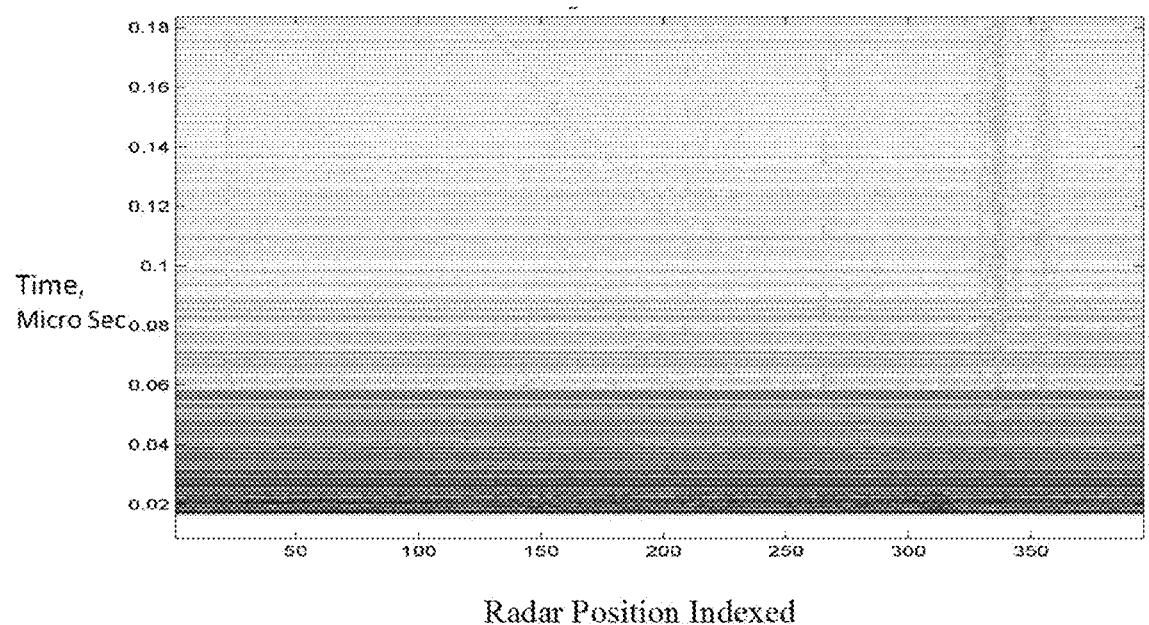
FIG. 5b shows exemplary range-gated data.
Figure 5C:
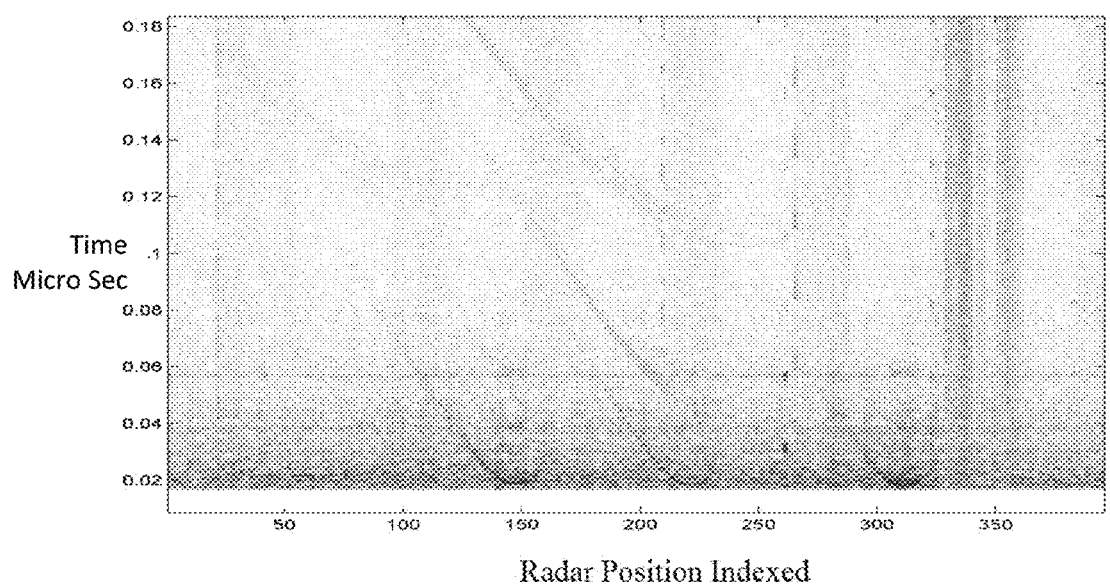
FIG. 5c shows exemplary SIR-suppressed data.

By estimating the SIR component in Module 110 in FIG. 4, we could also remove the SIR signature in the measured radar signal in eq. (2). The resultant output is the radar data that are not only calibrated but also are not contaminated with the SIR signal. FIG. 5a shows a sample of the fast-time domain distribution of the measured data, its range-gated version, and the resultant SIR-suppressed data. Since we are interested in processing the data of the targets that are more than 3 m away from the Transmitter/Receiver platform, we range gate the fast-time domain data below that range. This removes a very strong Transmitter/Receiver coupling and puts the emphasis of the adaptive filter to suppress the SIR signature components at ranges beyond 3 m. Note that the actual radar signal is in fact significantly weaker than the SIR signal. FIGS. 5b and 5c, respectively, are the 2D distributions (in fast-time and aperture domains) of the range-gated and SIR-suppressed data.

4. Calibration of Multi-Transmitter/Receiver Channel Images. A signal processing system for calibration of multi-transmitter/receiver channel images that comprises of these components:

a. a system model for uncalibrated reconstructed images in a multi-transmitter and multi-receiver radar on a moving platform, wherein $$f_{lM}(x_m,y_n)=f_l(x_m-x_{ls},y_n-y_{ls})\exp(j\phi_l); \text{ and}$$

b. An iterative correlation-based phase and time-delay estimation algorithm to calibrate multi-transmitter/receiver images using a reference image that is generated from the mean value of the multi-transmitter/receiver images in each iteration.

Specifically, after recovering the SAR signal $s_l(t,u_j)$, $l=1, 2, \ldots L$, for each Transmitter/Receiver pair, we use the 2D Time Domain Correlation (TDC) imaging or backprojection method to form a coherent image on discrete points on the ground (x, y) plane. We denote the uniform grid on the ground plane that we form the image by $(x_m, y_n)$. In this case, the l-th image that is constructed via the following:

$$f_l(x_m, y_n) = \iint\limits_{(t,u)} s_l(t, u) s^*_{lmn}(t, u) dt du, \quad (3)$$

where $s^*_{lmn}(t,u)$ is the complex conjugate of the l-th Transmitter/Receiver pair bistatic radar signature for an ideal point (omni-directional) target that is located at the ground plane coordinates of $(x_m, y_n)$. (We use continuous fast-time and synthetic aperture to express the TDC equation; the steps that are required for the discrete implementation of this approach can be found, for example, in chapter 4 of M. Soumekh, Synthetic Aperture Radar Signal Processing, Wiley, New York, 1999, incorporated herein by reference.

The l-th Transmitter/Receiver pair bistatic image, that is, $f_l(x_m, y_n)$ suffers from the left/right side layover effect; that is, it cannot separate the left and right side of the imaging scene. The final step of coherently adding these images yields the desired image:

$$f(x_m, y_n) = \sum_{l=1}^{L} f_l(x_m, y_n). \quad (4)$$

As we mentioned before, at the beginning of each ALARIC test and data collection, we make calibration measurements using in-scene targets with the radar platform stationary. The resultant calibration data can be used on the measured data or during the image formation. In the case when calibration data are not available, we have developed an alternative adaptive method to counter the unknown relative time-delays in the multi-Transmitter/Receiver channels.

We start with a simplifying assumption that such errors are approximately spatially-invariant in relatively small targets areas. Based on the study of the actual data, we have determined that an area of size 10 m by 10 m is sufficiently small for the above-mentioned assumption to be valid for ALARIC. Within this area, we model the formed image from the l-th uncalibrated Transmitter/Receiver pair bistatic measured data via the following:

$$f_{lM}(x_m,y_n)=f_l(x_m-x_{ls},y_n-y_{ls})\exp(j\phi_l), \quad (5)$$

where ($x_{ls}$, $y_{ls}$) represents an unknown shift in the spatial domain, and $\phi_l$ is an unknown phase. We have also developed an adaptive LMS-based algorithm that/estimates the above unknown shifts and phase.

Figure 6:
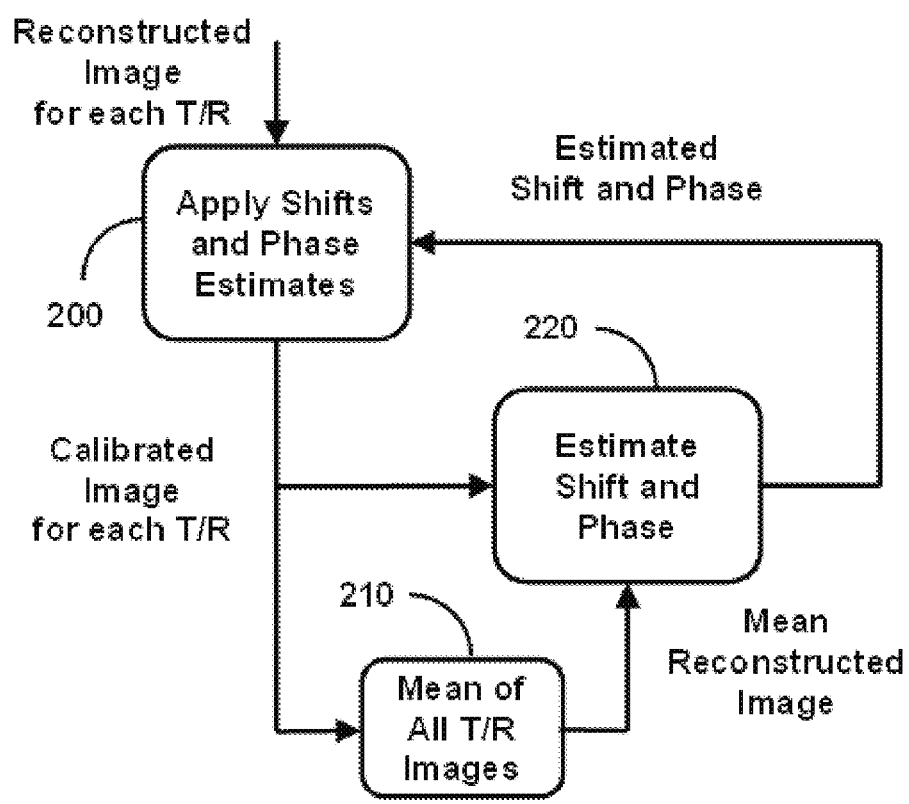
FIG. 6 shows an exemplary calibration of multi-Transmitter/Receiver channel images.

The algorithm flowchart is shown in FIG. 6. Specifically, FIG. 6 shows an exemplary calibration of multi-transmitter/receiver channel images. Inputs to Module 200 are the reconstructed bistatic image for each transmitter/receiver pair and the estimates of shift and phase for that bistatic pair. At the start of the iteration, the reconstructed image is simply the backprojection image for that bistatic pair (without any calibration) and zero values for the estimates of shift and phase. After each iteration and construction of a set of estimates for the shift and phase, then those are applied to the bistatic image resulting in the output that is referred to as Calibrated Image for each T/R in FIG. 6. Calibrated images for all T/R pairs are averaged in Module 210 of FIG. 6. The result is a calibrated image of the interrogate scene. However, the iteration can be continued by estimating the relative phase and shift of this image with each one of the calibrated T/R images in Module 220. The resultant phase and shift estimates for each T/R pair are then used in Module 200 for further refinement (calibration) of its bistatic reconstructed image.

5. Image Enhancement via t-Score Weighting

The moving Gator and, as a result, the Transmitter/Receiver antennas experience changes in their coordinates due to the unevenness of the road, the operator's (driver's) reaction to various physical factors, etc. These spatial domain variations (motion errors) are subtle and, thus, the GPS system would not be able to detect/record them. The presence of these unknown motion errors result in artifacts, that manifest in undesirable extended sidelobes in the formed imagery.

Meanwhile, ALARIC through its multi-channel Transmitter/Receiver system provides L sets of $f_l(x_m, y_n)$ images for l=1, 2, ... L. If a reflector was located at the coordinates ($x_m$, $y_n$), then everyone of these L images would exhibit a strong energy at those coordinates with some kind of sidelobes. However, the shapes of these sidelobes are not the same; that is, how and where the sidelobes appear in the formed image vary in the L images. This fact is key for an operation that we introduce in this section to enhance the formed image fidelity via suppressing the undesirable sidelobes.

We redefine the backprojection image with a scale factor to be the mean of the multi-Transmitter/Receiver bistatic pair $f_l(x_m, y_n)$ images for l=1, 2, ... L:

$$f(x_m, y_n) = \frac{1}{L}\sum_{l=1}^{L} f_l(x_m, y_n). \tag{6}$$

We identify the t-scored weighting of all channels by:

$$T(x_m, y_n) = \frac{f(x_m, y_n)}{\sigma(x_m, y_n)}, \tag{7}$$

where $$\sigma(x_m, y_n) = \sqrt{\frac{1}{L}\sum_{l=1}^{L}[f_l(x_m, y_n) - f(x_m, y_n)]^2} \tag{8}$$

is the standard deviation of the multi-Transmitter/Receiver bistatic images. Finally, we define the t-scored-weighted reconstructed image via the following:

$$f_{ts}(x_m, y_n) = T(x_m, y_n) f(x_m, y_n). \tag{9}$$

The t-score weighting enhances the true targets while suppressing the undesirable sidelobes.

Figure 7:
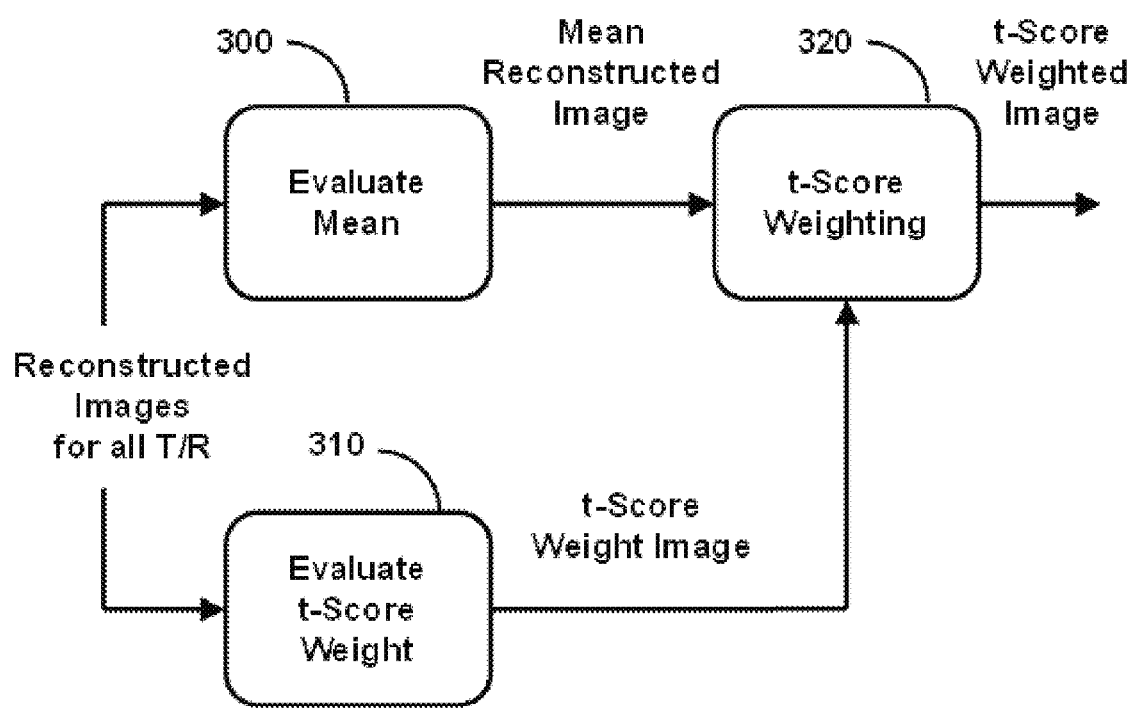
FIG. 7 shows an exemplary image enhancement via t-score weighting.

The algorithm flowchart is shown in FIG. 7. Specifically, FIG. 7 shows an exemplary image enhancement via t-score weighting. The process begins by constructing the average of all the bistatic reconstructed T/R images in Module 300. The t-score weight, which we showed in Eq. (7), is constructed in Module 310. The final t-score weighted image is formed in Module 320 via the expression in Eq. (9).

Figure 8A:
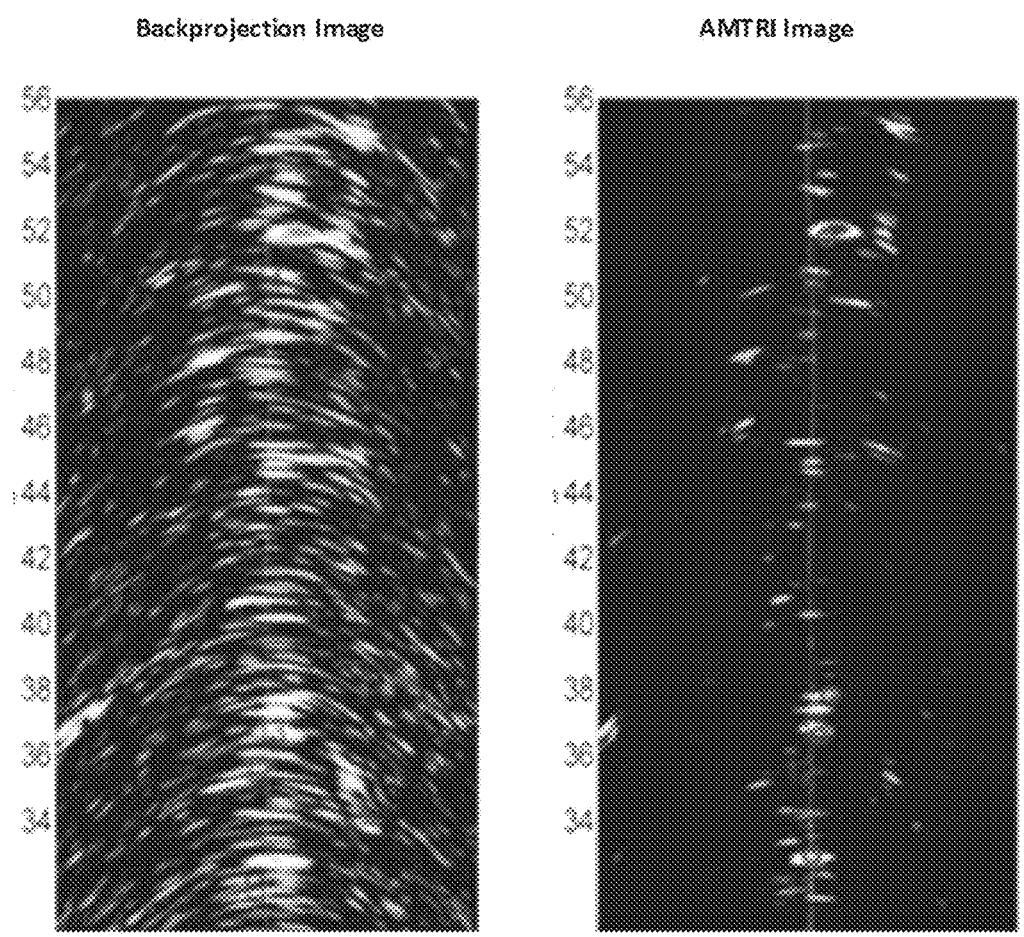
FIG. 8a shows an exemplary reconstructed image using: a) conventional backprojection (left); and b) adaptive multi-transceiver processing (right).
Figure 8B:
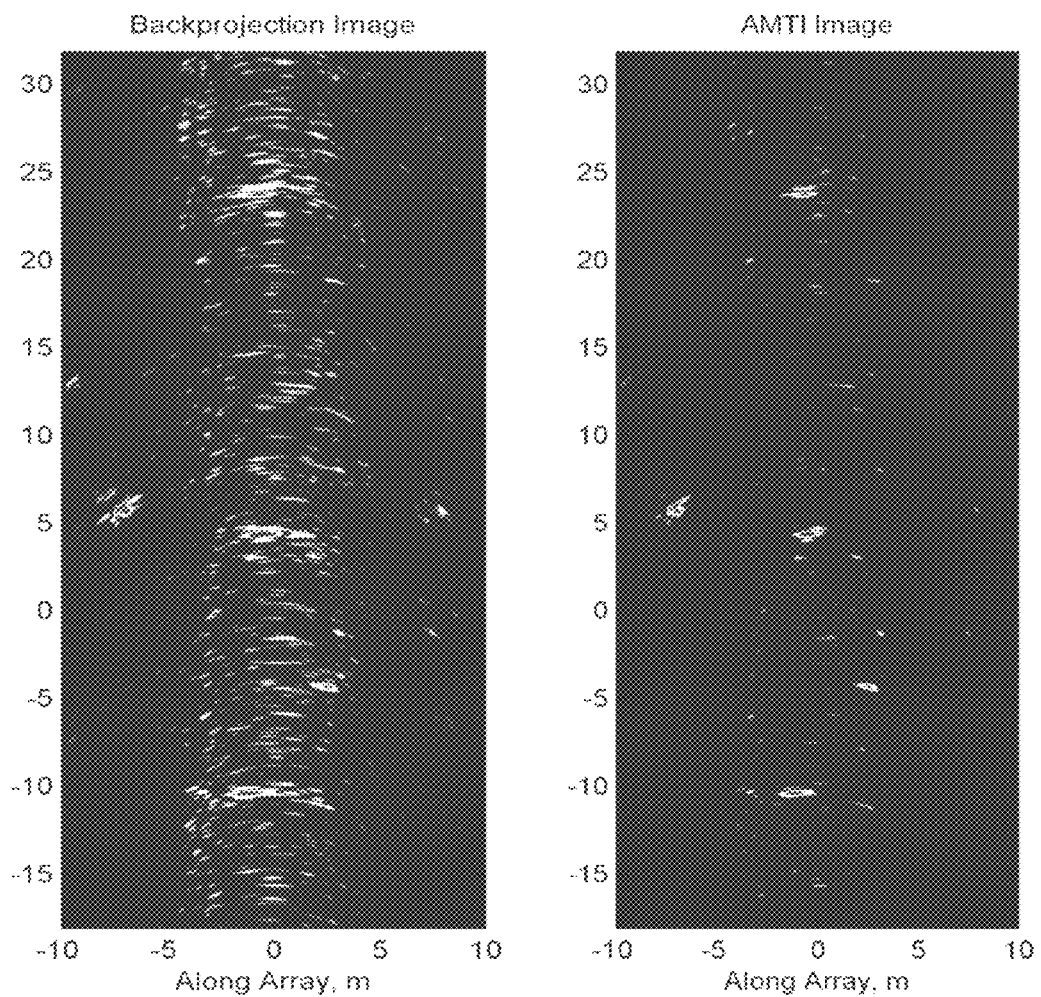
FIG. 8b shows an exemplary reconstructed image using: a) conventional backprojection (left); and b) adaptive multi-transceiver processing (right).

FIG. 8a exhibits the reconstructed image of a scene that is formed using the conventional backprojection technique (on the left), and the image of the same scene that is processed with the Adaptive Multi-Transmitter/Receiver Imaging technique (on the right). In the figure, the radar is approaching from the bottom. FIG. 8b shows similar results for a different run/test. Specifically, FIG. 8b shows another exemplary reconstructed image using conventional backprojection and adaptive multi-transceiver processing for a different run/test. Several areas with similar target emplacement also yielded similar results.

6. Ground Surface Targets (Clutter) Suppression Using Multi-Polarization Data

As we mentioned before, the transmitters and receivers of the radar array system is comprised of both horizontally and vertically polarized antenna/horns. Hence, a set of four complex or coherent (that is, both magnitude and phase information are included) images are produced by processing the data of these transmitters and receivers:

1. Horizontal transmitter and horizontal receiver: $f_{HH}(x, y)$;
2. Horizontal transmitter and vertical receiver: $f_{HV}(x, y)$;
3. Vertical transmitter and horizontal receiver: $f_{VH}(x, y)$; and
4. Vertical transmitter and vertical receiver: $f_{VV}(x, y)$.

The main electromagnetic wave property that is exploited here to suppress the surface targets is that the vertically-polarized radar waves can penetrate from air to soil as well as soil to air when it experiences the significant impedance mismatch at the boundary of the two media; however, the same is not true for the horizontally-polarized radar waves. Thus, in theory, we can extract the signature of buried targets via, for example, subtracting the VH image (called reference image) from the VV image (called the test image); that is, the following change detection (difference) image:

$$f_{dVVVH}(x,y) \equiv f_{VV}(x,y) - f_{VH}(x,y). \tag{10}$$

However, a surface target exhibits different Image Point Responses (IPRs) in the two VV and VH images (though the target appears at the same spatial coordinates). Meanwhile, these dual polarization variations in the surface target IPRs are unpredictable since they depend on the physical properties, shape, orientation, etc. of the surface target (e.g., a piece wooden branch, a metal object, etc.).

The challenge of this problem is to blindly calibrate the IPRs of the multi-polarization images. We use a 2D adaptive filtering for this objective which is outlined next. (See, e.g., exemplary adaptive filtering of any of, e.g., M. Soumekh, Synthetic Aperture Radar Signal Processing, Wiley, New York, 1999; M. Soumekh, "Signal Subspace Fusion of Uncalibrated Sensors with Application in SAR and Diagnostic Medicine," IEEE Transactions on Image Processing, vol. 8, no. 1, pp. 127-137, January 1999; K. Ranney and M. Soumekh, "Hyperspectral anomaly detection within the signal subspace," IEEE Geoscience and Remote Sensing Letters, vol. 3, no. 3, pp. 312-316, July 2006; K. Ranney and M. Soumekh, "Signal subspace change detection in averaged multilook SAR imagery," IEEE Transactions on Geoscience and Remote Sensing, vol. 44, no. 1, pp. 201-213, January 2006; L. Nguyen, M. Ressler, D. Wong, M. Soumekh, "Enhancement of backprojection SAR imagery using digital spotlighting preprocessing," Proceedings of IEEE Radar Conference, pp. 53-58, 2004; and U. Majumder, M. Soumekh, M. Minardi, and J. Kirk, "Spatially-varying calibration of along-track monopulse synthetic aperture radar imagery for ground moving target indication and tracking," IEEE International Radar Conference, pp. 452-457, 2010, all of which are incorporated by reference.)

6a. Adaptive Change Detection via Signal Subspace Processing

To model the change in IPR between images, we let represent the reference SAR image and be the test image. For instance, examples of the reference and test images for our problem include:

a. $f_1(x,y) \equiv f_{VH}(x,y)$; and $f_2(x,y) \equiv f_{VV}(x,y)$;  (11)

b. $f_1(x,y) \equiv f_{HH}(x,y)$, and $f_2(x,y) \equiv f_{VV}(x,y)$.  (12)

The simplest way to model the relationship between the reference and test images is to assume that these variations are invariant in the 2D spatial domain. In that case, the monostatic and bistatic images are related via the following:

$$f_2(x, y) = f_1(x, y) \otimes h(x, y) \quad (13)$$

$$= \int f_1(x-u, y-v) h(u, v) du dv$$

where $\otimes$ represents two-dimensional convolution, and h (x, y) is an unknown two-dimensional filter. This filter can be determined using the Least Mean Squares (LMS) algorithm; this approach is called adaptive filtering.

Figure 9:
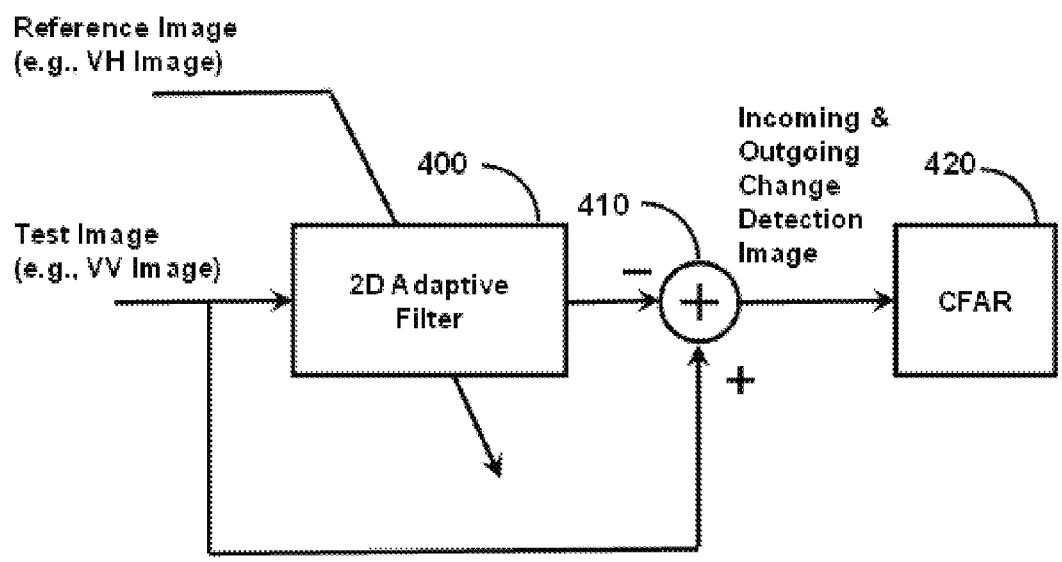
FIG. 9 shows an exemplary adaptive change detection with multi-polarization images.

The system flowchart is demonstrated in FIG. 9. Specifically, FIG. 9 shows an exemplary adaptive change detection with multi-polarization images. The reference and test images (e.g., VH and VV images) are inputs to Module 400 that is a 2D adaptive filter. The output is the adaptively-filtered reference image under the null hypothesis, that is, there is no change between the two images; the adaptive filter only compensates for calibration errors between the two input images. The calibrated reference image is subtracted from the test image in Module 410. The resultant is the change image: its positive part (incoming change) signifies the targets that are in the test (VV) image but are not in the reference (VH) image; and its negative part (outgoing change) contains the targets that are in the reference (VH) image but are absent in the test (VV) image.

Finally, Module 420 is a Constant False Alarm Rate (CFAR) algorithm to automatically detect the incoming and outgoing changes in the interrogated imaging scene. In the case of the cited example where the reference image is the VH image and the test image is the VV image, the incoming change represents the buried targets.

A more realistic miscalibration model for the two receiver channels is based on the fact that the filter is spatially-varying. In this case, the relationship between the monostatic and bistatic images can be expressed via the following:

$f_2(x,y) = \int f_1(x-u,y-v) h_{xy}(u,v) du dv,$  (14)

where in this model the filter $h_{xy}(u, v)$ varies with the spatial coordinates, that is, (x, y). While the above model is a more suitable one, however, it is computationally prohibitive to implement the LMS or SSP method at every pixel point in the formed imaged.

A practical alternative is to assume that the filter is approximately spatially-invariant within a small area in the spatial domain; we will address the spatially-varying filter issue later. In this case, we can divide the image scene into sub-patches within which the filter can be approximated to be spatially-invariant. The resultant model is given by:

$$f_{2l}(x, y) = f_{1l}(x, y) \otimes h_l(x, y) \quad (15)$$

$$= \int f_{2l}(x-u, y-v) h_l(u, v) du dv.$$

where l represents an index for the subpatches.

Next, we outline a practical method that we refer to as the spatially-varying SSP approach to solve for the 2D adaptive filter for the available discrete data. To formulate the problem for the discrete data, we begin with the following spatially-invariant 2D discrete convolution model to describe the continuous domain relationship between the reference and test images:

$$f_2(x_i, y_j) = \sum_{m=-n_x}^{n_x} \sum_{n=-n_y}^{n_y} h_{mn} f_1(x_i - m\Delta_x, y_j - n\Delta_y). \quad (16)$$

The variables $(\Delta_x, \Delta_y)$ represent the sample spacing in the (x, y) domain, $(x_i, y_j)$ represent the discrete pixel locations and $h_{mn}$ is an unknown IPR.

Figure 10:
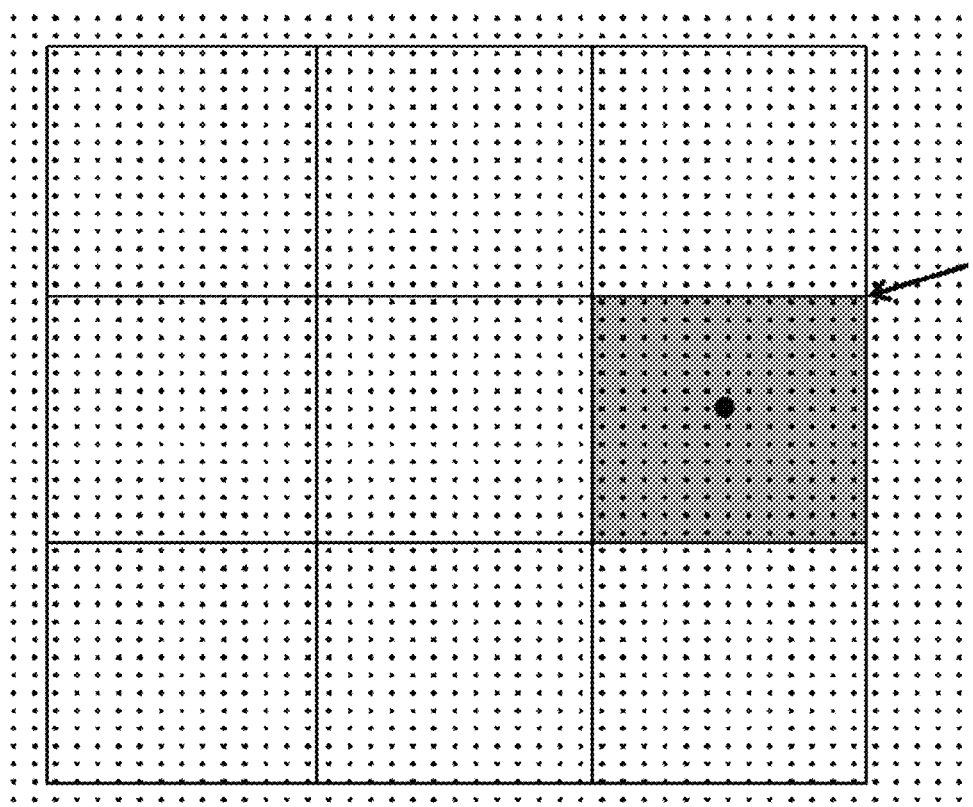
FIG. 10 shows an exemplary local signal subspace processing to determine 2D adaptive filter within a subpatch.

As we mentioned earlier, the miscalibration filter is spatially-varying, implying that the filter coefficients, $h_{mn}$, are no longer spatially invariant across the entire image. In this case, a more general model that incorporates variations in both IPR and is a 2D spatially-varying system as shown in the following (see FIG. 10):

$$f_2^{(l)}(x_i, y_j) = \sum_{m=-n_x}^{n_x} \sum_{n=-n_y}^{n_y} h_{mn}^{(l)} f_1^{(l)}(x_i - m\Delta_x, y_j - n\Delta_y), \quad (17)$$

where $h_{mn}^{(l)}$ represents the spatially-varying differential IPR for each l-th sub-region that incorporates any spatial warping, variations in the radar sensor, etc. (FIG. 10 relates to an exemplary local signal subspace processing to determine 2D adaptive filter with a subpatch. Here, subpatch number l is centered at $(x_l, y_l)$, where the solution of 2D adaptive filter is assigned to this grid point.) This model states that each point in the test image is a linear combination of the reference image and its spatially shifted versions around that pixel point; the coefficients of the linear model, which identify the IPR for that pixel, are spatially varying. That is, we obtain a different set of coefficients for each of the k sub-regions. Gram-Schmidt orthogonalization procedure is used to estimate the filter coefficients $h_{mn}^{(l)}$ from the reference and test radar images; this is outlined next.

Using the Gram-Schmidt orthogonalization procedure on the image $f_1^{(l)}(x_i, y_j)$ and its shifted versions generate a set of orthonormal basis functions $\theta_{mn}^{(l)}(x_i, y_j)$. These basis functions are then correlated with $f_2(x, y)$ to determine the coefficients for these basis functions $h_{mn}^{(l)}$. These basis functions and coefficients are used to generate an estimate of $f_2(l)(x_i, y_j)$ which is subtracted away from the test image as shown in the following:

$$f_{d12}^{(l)}(x_i, y_j) = f_2^{(l)}(x_i, y_j) - \sum_{m=-n_x}^{n_x} \sum_{n=-n_y}^{n_y} h_{mn}^{(l)} \theta_{mn}^{(l)}(x_i, y_j) \quad (18)$$

$$= f_2^{(l)}(x_i, y_j) - \hat{f}_2^{(l)}(x_i, y_j)$$

The variable $\hat{f}_2^{(l)}(x_i, y_j)$ denotes the estimate of $f_2^{(l)}(x_i, y_j)$ produced by the SSP. If there are no changes in the scene, the result of this function, $f_{d12}^{(l)}(x_i, y_j)$ should be zero. When there are changes in the scene the result should not be zero. This allows us to determine what objects have entered the scene.

6b. Change Detection via Normalized Forward-Backward Signal Subspace Processing

With this method of change detection there are errors that crop up due to the fact that the IPR used to make the estimate of the test image is imperfect. One way to help get rid of some of these errors is to use forward-backward signal subspace processing. Just like the forward relation between the two images the backward relation is defined by the function:

$$\hat{f}_1^{(l)}(x_i, y_j) = \sum_{m=-n_x}^{n_x} \sum_{n=-n_y}^{n_y} g_{mn}^{(l)} \theta_{mn}^{(l)}(x_i, y_j), \quad (19)$$

The variable $g_{mn}^{(l)}$ is the coefficients for the basis functions $\theta_{mn}^{(l)}(x_i, y_j)$. The basis functions for this case are formed from the image $f_2^{(l)}(x_i, y_j)$ and its shifted versions. The backward Signal Subspace Difference (SSD) is then constructed via $$f_{d21}^{(l)}(x_i, y_j) = f_1^{(l)}(x_i, y_j) - \hat{f}_1^{(l)}(x_i, y_j) \quad (20)$$

The error (change detection) signal at $(x_i, y_j)$ is defined to be the difference of the magnitudes of the forward and backward SSD signals; that is, $$e^{(l)}(x_i, y_j) = |f_{d21}^{(l)}(x_i, y_j)| - |f_{d21}^{(l)}(x_i, y_j)|. \quad (21)$$

The error signal can be examined to determine the three different cases for change detection. These cases are no change, target emplaced and target removed. When there is no change the error signal is zero. When a target is added, the error signal is positive and the error signal is negative when a target is removed.

Another source of false detections is due to the variability in the clutter magnitudes in the image. For example, when taking the difference of an object with a very high signal level, even if there is a significant level of suppression, the residual will still be relatively high compared to other targets in the image. When looking for targets that don't have very high returns, these residuals could be a significant source of false alarms. One way to deal with this issue is to normalize the SSD. Normalization makes it so the result of the SSD is the relative differences between the images instead of the absolute difference. So a target that subtracts away well will have a low signal level in the resulting image even if the target has a high signal level to begin with. This also means that a target with a low signal level that is added or subtracted from the scene will have a higher signal level in the resulting image. This helps expose what changes actually occurred in the images.

The procedure to normalize the images involves low pass filtering the magnitude of the images as described here:

$$f_{1LP}^{(l)}(x_i, y_j) = \sum_{m=-n_x}^{n_x} \sum_{n=-n_y}^{n_y} l_{mn} f_1^{(l)}(x_i, y_j), \quad (22)$$

where $l_{mn}$ is the low-pass filter and $f_{1LP}^{(l)}(x_i, y_j)$ is the filtered version of the reference image. The test image is filtered in the same manner by the same low-pass filter. The forward and backward SSD signals are then divided by the filtered images to generate the normalized signals. These signals are then subtracted as shown in the following equation:

$$e_{norm}^{(l)}(x_i, y_j) = \frac{|f_{12d}^{(l)}(x_i, y_j)|}{f_{1LP}^{(l)}(x_i, y_j)} - \frac{|f_{21d}^{(l)}(x_i, y_j)|}{f_{2LP}^{(l)}(x_i, y_j)}. \quad (23)$$

There are three possible results to this equation. First the result could be zero. A result of zero means that there has been no change. A positive result means that there is an incoming change. This is because the change will show up in $f_{12d}^{(l)}(x_i, y_j)$ but not $f_{21d}^{(l)}(x_i, y_j)$. The magnitude of the signal will be relative to the difference in what was at the location before and what was added. A negative result means that a target was subtracted from the scene.

Next, we address the spatially-varying nature of the 2D adaptive filter. As we mentioned earlier, a practical alternative for our system model to relate multi-polarization images is that the filter is approximately spatially-invariant within a small area in the spatial domain. In this case, we can divide the radar scene into subpatches within which the filter can be approximated to be spatially-invariant. The resultant model is given by:

$$f_{2l}(x, y) = f_{1l}(x, y) \otimes h_l(x, y) \quad (24)$$

$$= \int \int f_{1l}(x - u, y - v) h_l(u, v) du dv$$

where l represents an index for the subpatches. In the approach that we outlined earlier, that is, Local Signal Subspace Processing (LSSP), the LMS/SSP method is used to estimate the local unknown calibration filter $h_l(x, y)$; see FIG. 10.

Figure 11:
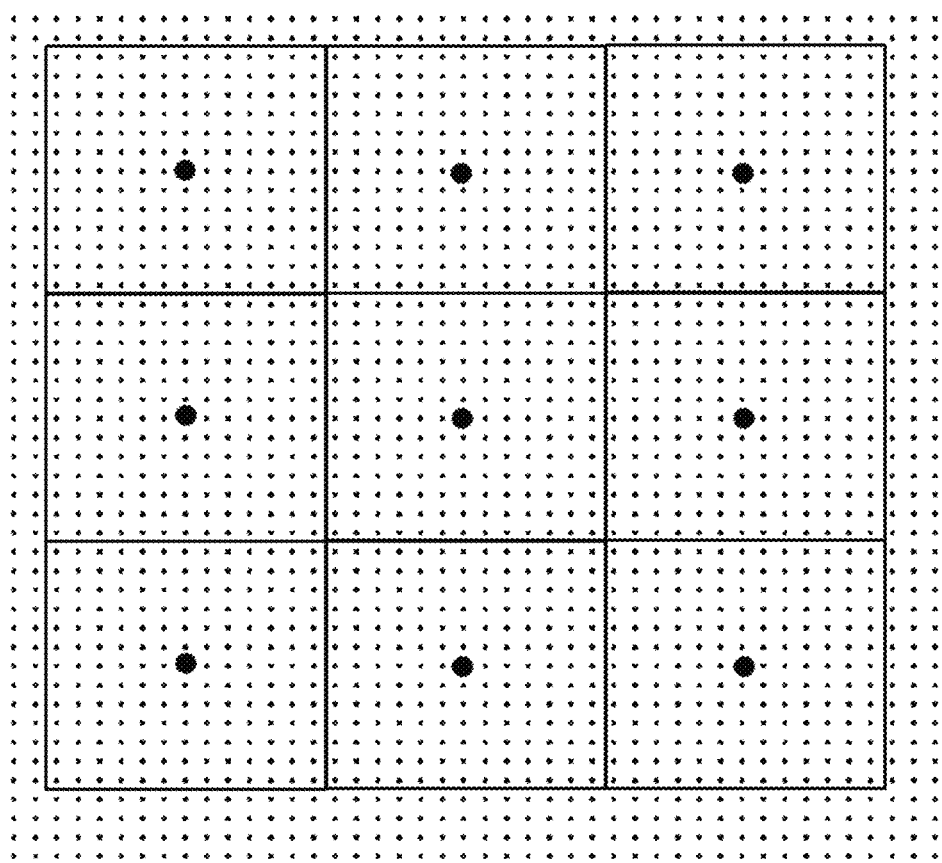
FIG. 11 shows an exemplary global signal subspace processing to determine spatially-varying 2D adaptive filter.

After this filter is estimated for each subpatch, an approach that we call Global Signal Subspace Processing (GSSP) is used to estimate the original spatially-varying filter $h_{xy}(u, v)$; see FIG. 11. FIG. 11 relates to a global signal subspace processing to determine spatially-varying 2D adaptive filter. For this purpose, available samples of 2D adaptive filter for the subpatches $h_l(u, v)$ are at the grid point $(x_l, y_l)$; these are shown as blue dots. For every $(u, v)$ (that is the 2D filter domain), the values of the 2D spatially-varying filter $h_{xy}(u, v)$ are interpolated on the original image grid in the spatial domain $(x, y)$ (black dots) from the available filter samples $h_l(u, v)$ at the grid points $(x_l, y_l)$ (blue dots). This spatially-varying version of LSSP, that is, GSSP calibrates two images at different polarizations via a 2D adaptive filter whose coefficients vary at every pixel point in the spatial domain. As a result, its SSD image does not possess boundary artifacts between the subpatches that are used for LSSP.

Figure 12:
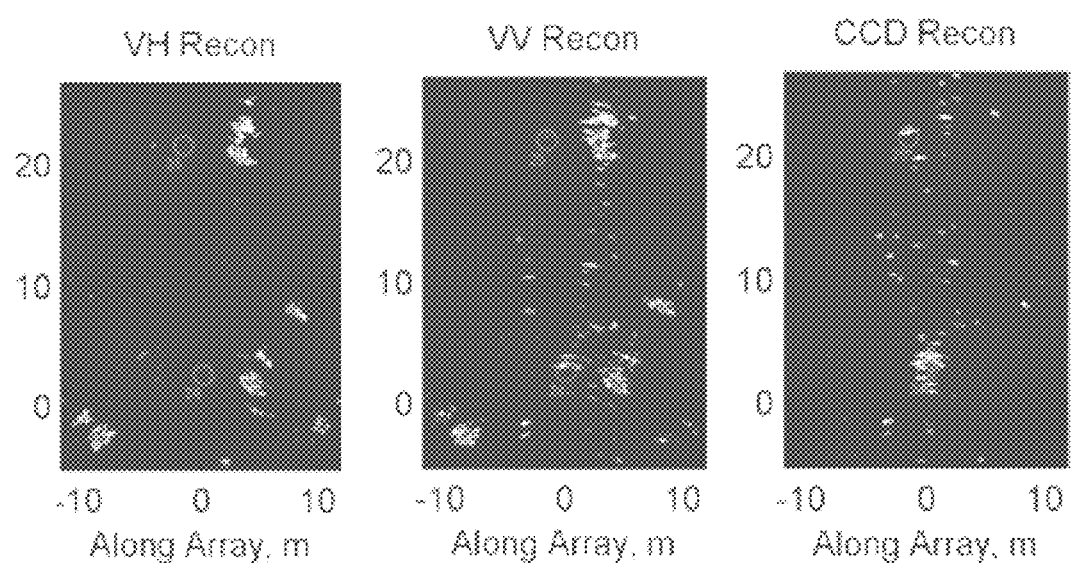
FIG. 12 shows an exemplary dual receiver polarizations (VH and VV) reconstructions of an area with two buried targets (Targets 24 and 25), and the resultant dual-pole CCD image.

FIG. 12 shows an example of CCD processing of dual receiver polarization data to detect buried targets. Specifically, FIG. 12 shows an exemplary dual receiver polarization (VH and VV) reconstructed of an area with two buried targets (Targets 24 and 25), and the resultant dual-pole CCD image. The imaging area contains two buried targets. The locations of these two targets are shown in the VH and VV reconstructions (Targets 24 and 25). Both the VH and VV images show various surface targets/clutter such as shrubs at the side of the road. Neither of the two buried targets is visible in the VH image. The VV image shows Target 24 clearly and Target 25 faintly. The CCD image shows both targets prominently while suppressing the surface clutter.

7. Simultaneous Waveform Diversified Transmissions at Dual Polarizations

Figure 13:
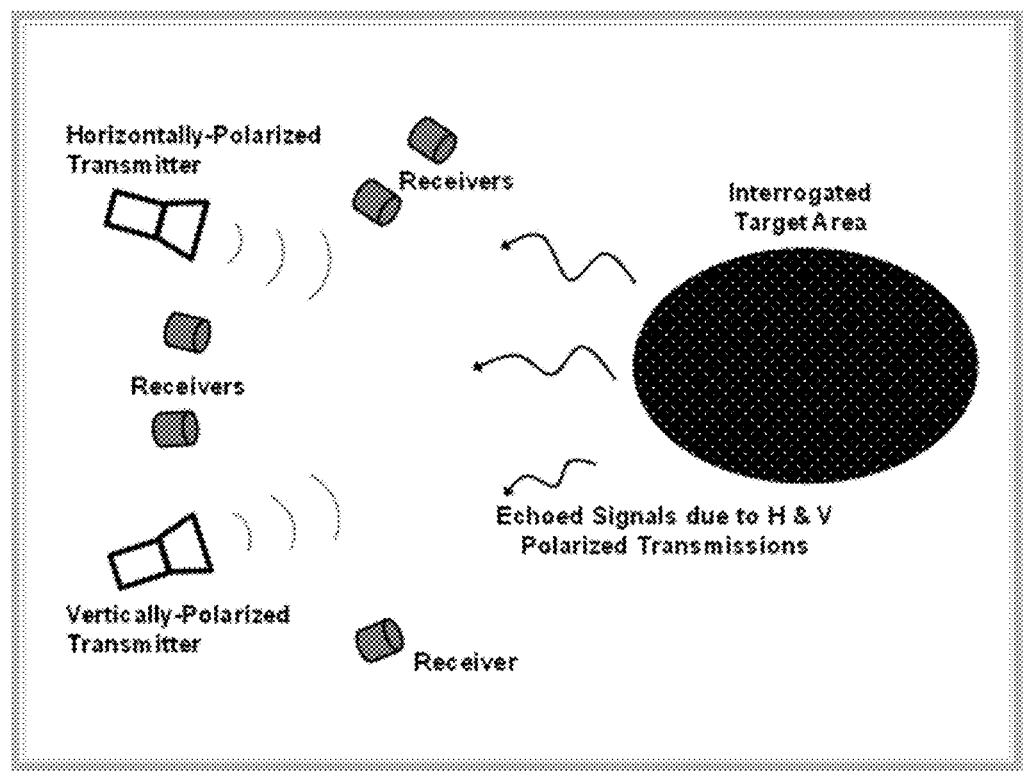
FIG. 13 shows an exemplary simultaneous Waveform Diversified Transmissions at Dual Polarizations.

Consider the imaging geometry of FIG. 13 in which two radar transmitters simultaneously irradiate a target area. Specifically, FIG. 13 shows exemplary simultaneous waveform diversified transmissions at dual polarizations. The two radar transmitters, however, operate at different polarization; one is horizontally-polarized and the other the vertically-polarized. Moreover, the two transmitters use diverse waveforms that are uncorrelated to each other. In other words, if the transmitted horizontally-polarized waveform is denoted with $p_H(t)$, and the transmitted vertically-polarized waveform is $p_V(t)$, then we have $$\int p_H(t) p^*_V(t-\tau) dt = 0, \qquad (25)$$

for all time-delay values of $\tau$.

Figure 14:
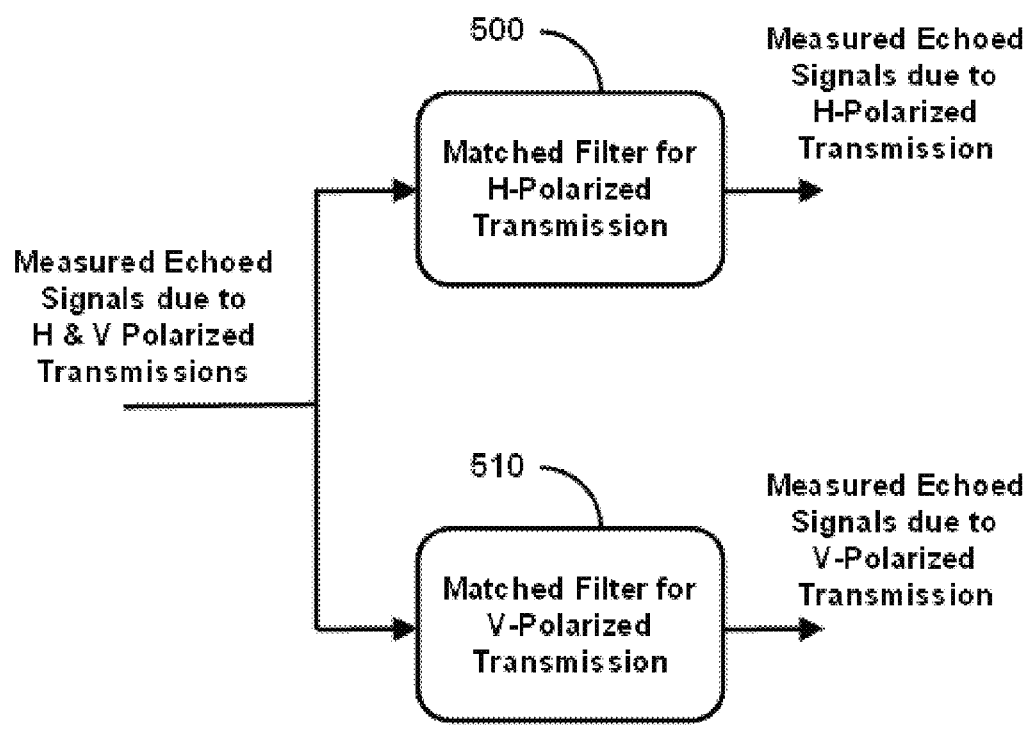
FIG. 14 shows an exemplary matched filter processing for simultaneous waveform diversified transmissions at dual polarizations.

The resultant echoed signals, that are sum of the echoed signals that are due to the two polarized transmitted waveforms, are measured by a set of spatially-diversified receivers as shown in FIG. 13. The measured signal for each receiver is then processed through the signal processing algorithm that is shown in FIG. 14. FIG. 14 shows an exemplary matched filter processing for simultaneous waveform diversified transmissions at dual polarizations. In the upper branch of the signal processor, that is Module 500, the total measured signal is matched-filtered with the transmitted horizontally-polarized waveform $p_H(t)$. This matched filter rejects/nulls the echoed signals that are due to the vertically-polarized transmission, that is, $p_V(t)$, since the two transmitted waveforms are uncorrelated to each other. (See, e.g., chapter 1 of M. Soumekh, *Synthetic Aperture Radar Signal Processing*, Wiley, New York, 1999; and M. Soumekh, "SAR-ECCM using phase-perturbed LFM chirp signals and DRFM repeat jammer penalization," *IEEE Transactions on Aerospace and Electronic Systems*, vol. 42, no. 1, pp. 191-205, January 2006, incorporated herein by reference.)

Thus, the output of Module 500 is the echoed signals that are due to the transmission of the horizontally-polarized waveform $p_H(t)$. In a similar fashion, the lower branch in FIG. 14 filter, that is, Module 510, uses a matched filter that is equal to the vertically-polarized waveform $p_V(t)$. In this case, this filter rejects the echoed signals that are due to the horizontally-polarized waveform $p_H(t)$; hence, the output of Module 510 is the sum of the echoed signals that are due to the vertically-polarized transmission, that is, $p_V(t)$. Finally, the outputs of Module 500 and Module 510 can then be separately processed through the imaging algorithms that were outlined in Sections 2 and 3 to produce the two horizontally-polarized and vertically-polarized images. These two images are then processed through the algorithm that was discussed in Section 4 to suppress the ground clutter and detect buried structures.

The main utility of the simultaneous transmission of waveforms for the two polarizations is the increase in sampling rate in the synthetic aperture domain and, thus, suppression and/or reduction of Doppler frequency aliasing. Without the simultaneous transmission at the two polarizations, the user is forced to alternate transmission between the two polarizations. This would result in a coarser aperture sample spacing and, thus, increase in Doppler frequency aliasing error. The transmission of uncorrelated waveforms at the two polarizations allows the user to simultaneously use both of the transmitters. Then, the signal processing modules in FIG. 14 are used to separate echoes signals for each of the two transmitted polarizations.

It is obvious that many modifications and variations of the present invention are possible in light of the above teachings. It is therefore to be understood that within the scope of the appended claims, the invention may be practiced otherwise than as described.

What is claimed is:

1. A method of standoff detection for surface and buried targets in or on the road side of a ground vehicle using RF impulse signal, the method comprising the steps of:

transmitting a sequence of RF impulse signals by using at least one impulse generator paired with a respective transmit antenna while the vehicle moves forward on the road, said transmit antenna being placed at the center of an antenna frame in either horizontal or vertical polarization, the antenna frame being mounted on an articulable telescope boom of the vehicle to enable the radar to be configured for different scanning modes;

receiving the return of impulse RF signals using an array of Vivaldi notch antennas, each regularly disposed as either horizontal or vertical polarization with respect to the antenna frame;

converting the impulse signals received from the Vivaldi notch antennas in analog format to digital format using a digitizer to digitize the analog signal as radar data;

interleaving the converted radar data with header and trailer to incorporate GPS information with the radar data;

processing the stream of radar data along with the GPS information to produce radar images for storage in computer memory as multi-transmitter/receiver channel images; and calibration of said multi-transmitter/receiver channel images based on:

a system model for uncalibrated reconstructed images in a multi-transmitter and multi-receiver radar on a moving platform, wherein $$f_{IM}(x_m, y_n, \phi_l) = f_I(x_m - x_{ls}, y_n - y_{ls}) \exp(j\phi_l),$$

where $(x_{ls}, y_{ls})$ represents an unknown shift in a spatial domain, and $\phi_l$ is an unknown phase; and an iterative correlation-based phase and time-delay estimation algorithm to calibrate multi-transmitter/receiver images using a reference image that is generated from the mean value of the multi-transmitter/receiver images in each iteration.

2. A method of standoff detection for surface and buried targets in or on the road side of a ground vehicle using RF impulse signal, the method comprising the steps of:

transmitting a sequence of RF impulse signals by using at least one impulse generator paired with a respective transmit antenna while the vehicle moves forward on the road, said transmit antenna being placed at the center of an antenna frame in either horizontal or vertical polarization, the antenna frame being mounted on an articulable telescope boom of the vehicle to enable the radar to be configured for different scanning modes;

receiving the return of impulse RF signals using an array of Vivaldi notch antennas, each regularly disposed as either horizontal or vertical polarization with respect to the antenna frame;

converting the impulse signals received from the Vivaldi notch antennas in analog format to digital format using a digitizer to digitize the analog signal as radar data;

interleaving the converted radar data with header and trailer to incorporate GPS information with the radar data;

processing the stream of radar data along with the GPS information to produce radar images for storage in computer memory; and multi-transmitter/receiver image enhancement via t-score weighting that generates an enhanced full-resolution image based on t-score weighting of a mean reconstructed image.

3. A method of standoff detection for surface and buried targets in or on the road side of a ground vehicle using RF impulse signal, the method comprising the steps of:

transmitting a sequence of RF impulse signals by using at least one impulse generator paired with a respective transmit antenna while the vehicle moves forward on the road, said transmit antenna being placed at the center of an antenna frame in either horizontal or vertical polarization, the antenna frame being mounted on an articulable telescope boom of the vehicle to enable the radar to be configured for different scanning modes;

receiving the return of impulse RF signals using an array of Vivaldi notch antennas, each regularly disposed as either horizontal or vertical polarization with respect to the antenna frame;

converting the impulse signals received from the Vivaldi notch antennas in analog format to digital format using a digitizer to digitize the analog signal as radar data;

interleaving the converted radar data with header and trailer to incorporate GPS information with the radar data;

processing the stream of radar data along with the GPS information to produce radar images for storage in computer memory;

optimizing signal returns for surface and buried targets based on:

placing the transmit antennas in either horizontal or vertical polarization for transmitting impulse RF signal, using two different sets of Vivaldi antennas for receiving the returned impulse RF signals, the first set of Vivaldi antennas, which has the frequency range from 200 MHz to 3000 MHz, is oriented in the vertical polarization, the second set of Vivaldi antennas, which has frequency range from 500 MHz to 3000 MHz, is oriented in the horizontal polarization, interleaving the location of the receive Vivaldi antennas, wherein the first antenna in the array is from the first set, and the second antenna is from the second set, and wherein the pattern of configuration is repeated for the rest of the receiving antennas in the antenna array, and collecting antenna data output for image processing, wherein the transmit and two types of receive antennas are spatially-diversified, some of which have H polarization and others with V polarization, wherein coherent complex four images that are formed from four polarizations, that is, VV, VH, HV and HH, are fused via an adaptive filtering method to suppress the surface targets/clutter while enhancing the signatures of buried targets, the adaptive filtering method comprising:

a continuous-domain multidimensional signal model and its discrete version to relate multi-polarization;

a localized adaptive filtering method based on LSSP to calibrate two images at different polarizations;

a forward and backward LSSP approach to create a difference image or SSD image, that represents changes or buried targets in the two images at different polarizations; and a spatially-varying version of LSSP, global signal subspace processing, to calibrate two images at different polarizations using a 2D spatially-varying filter that produces an SSD image that does contain boundary artifacts between the subpatches that are used in LSSP.

4. The method of standoff detection according to claim 3, wherein said continuous-domain multidimensional signal model and its discrete version to relate multi-polarization via a two-dimensional linear spatially-varying are for VV and VH images.

5. The method of standoff detection according to claim 3, comprising:

simultaneously transmitting two different and uncorrelated pulses or waveforms using radar transmitters with different polarizations; and matched filtering to separate the resultant echoes that are generated via illumination of the target area with the two uncorrelated transmissions at the Horizontal and Vertical polarizations.

6. The method of standoff detection according to claim 5, wherein said two different and uncorrelated pulses or waveforms have horizontal and vertical polarizations.

7. The method of standoff detection signal processing module according to claim 5, wherein said pulses are uncorrelated in time such that their cross-correlation is zero for all relative time delays of the two pulses.

* * * * *